United States Patent [19]
Lee et al.

[11] Patent Number: 5,404,560
[45] Date of Patent: Apr. 4, 1995

[54] MICROPROCESSOR HAVING EXTERNAL CONTROL STORE

[75] Inventors: Raymond Y. Lee, Salem, N.H.; Jeffrey M. Bessolo, Groton; Vyomesh Shah, Tewksbury, both of Mass.; Scott D. Vincelette, Bethlehem, Pa.; Steven M. Waldstein, Westford, Mass.; Jeffrey D. Nathan, Andover, Mass.; Steven E. Lang, Lincoln Center, Mass.

[73] Assignee: Wang Laboratories, Inc., Lowell, Mass.

[21] Appl. No.: 83,852

[22] Filed: Jun. 25, 1993

Related U.S. Application Data

[63] Continuation of Ser. No. 189,853, May 3, 1988, abandoned.

[51] Int. Cl.⁶ .............................................. G06F 15/00
[52] U.S. Cl. ..................... 395/800; 364/DIG. 1; 364/262.8; 364/243; 364/247; 364/247.3; 364/262.4; 364/243.7
[58] Field of Search .............. 395/400, 425, 775, 800

[56] References Cited

U.S. PATENT DOCUMENTS

| | | | |
|---|---|---|---|
| 4,307,445 | 12/1981 | Tredennick et al. | 364/200 |
| 4,330,823 | 5/1982 | Retter | 364/200 |
| 4,367,524 | 1/1983 | Budde et al. | 364/200 |
| 4,399,505 | 8/1983 | Druke et al. | 364/200 |
| 4,415,969 | 11/1983 | Bayliss et al. | 364/200 |
| 4,460,972 | 7/1984 | Homan et al. | 364/900 |
| 4,466,056 | 8/1984 | Tanahashi | 364/200 |
| 4,495,563 | 1/1985 | McDonough | 364/200 |
| 4,513,174 | 4/1985 | Herman | 364/200 |
| 4,550,369 | 10/1985 | Rokutanda et al. | 364/200 |
| 4,554,627 | 11/1985 | Holland et al. | 364/200 |
| 4,569,018 | 2/1986 | Hummel et al. | 364/200 |
| 4,648,034 | 3/1987 | Heninger | 364/200 |
| 4,677,586 | 6/1987 | Magar et al. | 364/900 |
| 4,771,376 | 9/1988 | Kamiya | 364/200 |
| 4,794,524 | 12/1988 | Carberry et al. | 364/200 |
| 4,811,345 | 3/1989 | Johnson | 364/200 |
| 4,825,363 | 4/1989 | Baumann et al. | 364/200 |
| 4,835,679 | 5/1989 | Kida et al. | 364/200 |
| 4,839,795 | 6/1989 | Iwaksaki | 364/200 |
| 5,041,969 | 8/1991 | Kawasaki et al. | 395/200 |

OTHER PUBLICATIONS

Vora et al, "A VLSI Implementation of the 32-Bit Eclipse Architecture", Proceedings of IEEE Int'l Conf on Computer Design (ICCD '83) pp. 311-314.
"80286 and 80287 Programmer's Reference Manual", Intel 1987, pp. 2-14-2-16 & 3-20.

*Primary Examiner*—Rebecca L. Rudolph
*Attorney, Agent, or Firm*—Kenneth L. Milik

[57] ABSTRACT

A central processing unit (CPU) 10 comprises an external control memory for storing microinstructions which correspond to macroinstructions read from a system memory. The microinstructions are 56 bits in length and are read in 28-bit segments. CPU 10 also comprises an internal memory management unit (MMU) 18 which comprises a plurality of address translation entry (ATE) registers four of which are permanent and sixteen of which are temporary in that the storage of a new translation entry occurs in a least recently used temporary translation entry register. CPU 10 also comprises a plurality of status register bits, some of which are settable only by predefined microinstructions. All of the status register bits are branchable. CPU 10 further comprises a condition code register the state of which may be determined by input signal pins. CPU 10 also comprises address generation logic which may generate a 24, 31 or 32 bit address upon a 32-bit address bus. The address generation logic is further operable for generating a memory storage address; the data being supplied by external logic, such as a coprocessor.

17 Claims, 10 Drawing Sheets

STATUS BIT LOGIC

MICROINSTRUCTION
FORMAT

MICROINSTRUCTION
PROCESS FIELD
FORMAT

MICROINSTRUCTION
MEMORY FIELD
FORMAT

MICROINSTRUCTION
CONDITION CODE
FIELD FORMAT

MICROINSTRUCTION
BRANCH FIELD
FORMAT

BRANCH TO NEXT MICROINSTRUCTION
(BNM) FORMAT

STATUS SETTING MICROINSTRUCTION
(SS) FORMAT

VIRTUAL ADDRESS FORMAT

PHYSICAL ADDRESS FORMAT

ATE FORMAT

ENTRY FORMAT (ATE [22:53])

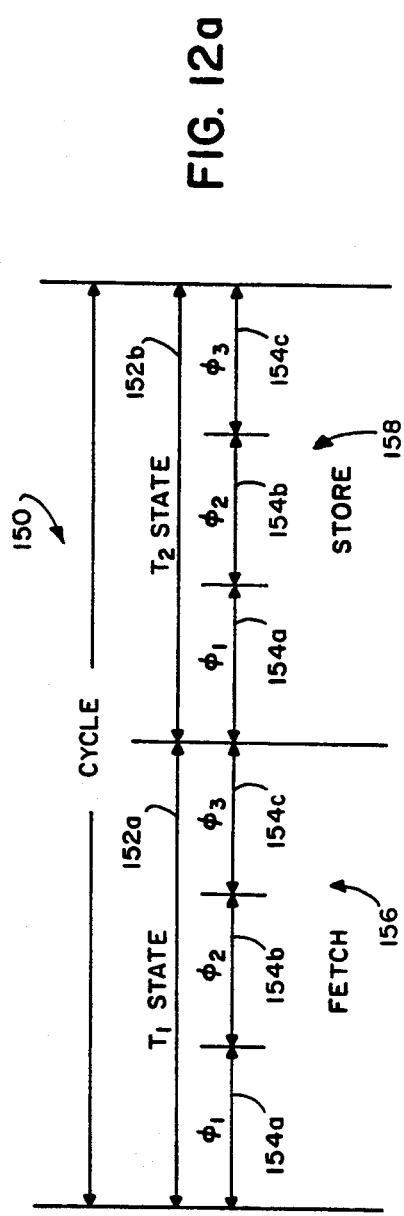
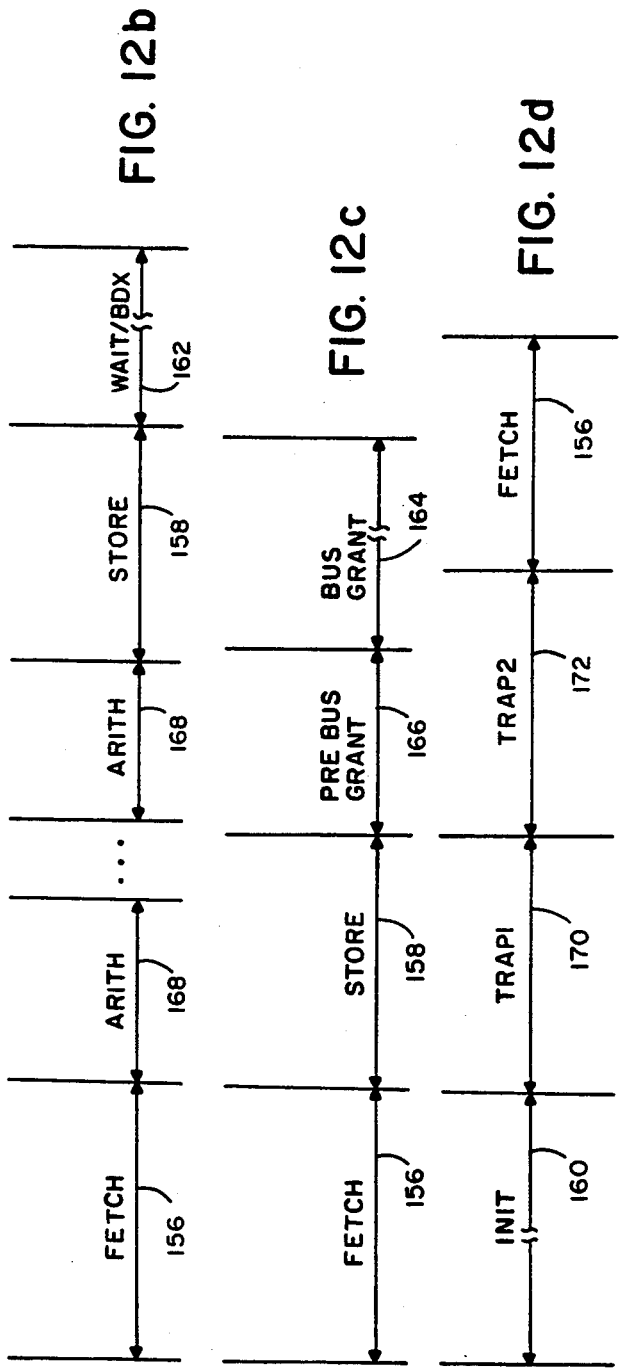
FIG. 12a
FIG. 12b
FIG. 12c
FIG. 12d

MICROPROCESSOR HAVING EXTERNAL CONTROL STORE

This is a continuation of application Ser. No. 07/189,853, filed on May 3, 1988, now abandoned.

FIELD OF THE INVENTION

This invention relates generally to digital data processors and, in particular, relates to an integrated circuit microprocessor having a number of new and useful features.

BACKGROUND OF THE INVENTION

Integrated circuit microprocessors are widely used for a variety of digital data processing applications. In general, most conventional microprocessors comprise an arithmetic/logic unit (ALU), a plurality of registers, and a memory address and data bus which may or may not be driven externally from the chip. Program instructions read from the memory are decoded into one or more microinstructions, the microinstructions operating to control the internal logic of the microprocessor to accomplish a predefined action as specified by the instruction. For example, an ADD instruction is typically decoded into a plurality of microinstructions which perform the task of accessing the data to be added, directing the data into the ALU and storing the result of the addition. In conventional microprocessors these microinstructions are stored internally within a control store which is typically a read only memory which is integrated within the microprocessor circuitry. This creates a problem in that the control store is normally inaccessible to devices outside of the microprocessor, making the reading and/or modification of the microinstructions within the control store by external devices difficult or impossible.

One such external device may be a coprocessor, such as a floating point arithmetic acceleration unit. Such acceleration units typically work in conjunction with the microprocessor and provide extended mathematical capability in those applications where such extended capability is required. As can be appreciated, the degree of coupling between the microprocessor and the coprocessor is an important system consideration in that the degree of coupling typically affects the speed and efficiency of the execution of a given program.

Other factors which influence the speed and efficiency of conventional microprocessors are the flexibility of various internal registers, such as a status register which has bits reflecting the results of various logical, arithmetic and other conditions within the device. The ability to set, reset and modify the state of the status bits in order that conditional branch instructions may be employed is thus an important aspect in the overall efficiency and instruction processing capability of the microprocessor.

Furthermore, for those microprocessors which employ some type of memory management unit (MMU) for translating virtual machine addresses to a physical memory address the efficiency of the MMU in maintaining an address translation table which ensures a high "hit" rate for translated instructions is an important system consideration.

SUMMARY OF THE INVENTION

The foregoing problems are overcome and other advantages are realized by a microprocessor having, in accordance with the invention, an arithmetic/logic execution means unit for performing arithmetic and/or logical operations on data in response to one or more microinstructions corresponding to a macroinstruction; a memory interface for reading data from a first memory and for storing data within the first memory, the first memory storing at least data and macroinstructions. The memory interface means includes a first address bus and a first data bus, the first data bus being operably coupled at least between the arithmetic/logic execution unit and the first memory. The microprocessor further includes a macroinstruction decoding circuit, coupled to the first data bus, for decoding into a corresponding microinstruction or microinstructions the macroinstructions read from the first memory. The macroinstruction decoding circuit includes a second memory disposed external to the microprocessor for storing the microinstructions; a circuit for converting a macroinstruction into an address within the second memory of a corresponding one or ones of the microinstructions; a second address bus coupled between the converting circuit and the second memory for providing the address to the second memory; and a second data bus coupled between the second memory and the arithmetic/logic execution unit for reading in an addressed microinstruction for controlling the operation of the arithmetic/logic execution unit.

In accordance with another aspect of the invention there is disclosed a microprocessor having a status register that includes a first predetermined number of status bits the logical state of which are determined at least by the result of the operation of an arithmetic/logic execution unit, the status register further including a second predetermined number of status bits the logical state of which are directly determined only by the logical state of a predefined bit or bits of predetermined microinstructions.

In accordance with a further aspect of the invention there is disclosed a microprocessor having a condition code register that includes a predetermined number of condition bits and at least one input signal pin the logical state of which is determined by logic external to the microprocessor; wherein a logical state of at least one of the condition code register bits is determined by the logical state of one of the input signal pins in accordance with the logical state of a predefined bit or bits of predetermined microinstructions.

In accordance with a still further aspect of the invention there is disclosed a microprocessor that includes an arithmetic/logic execution unit for performing arithmetic and/or logical operations on data in response to one or more microinstructions corresponding to a macroinstruction; a memory interface for reading data from a first memory and for storing data within the first memory, the first memory storing at least data and macroinstructions. The memory interface includes a first address bus and a first data bus, the first data bus being operably coupled at least between the arithmetic/logic execution unit and the first memory. The microprocessor further includes a macroinstruction decoding circuit, coupled to the first data bus, for decoding into a corresponding microinstruction or microinstructions the macroinstructions read from the first memory. The microprocessor further includes an address generation unit for generating at least a virtual memory address for accessing address locations within the first memory means. The address generation unit has an output coupled to the first address bus and includes address translation circuitry responsive to a logical state of a predefined bit or bits of predetermined ones of the microinstructions for translating the virtual memory address to a physical memory address. The address translation circuit includes address translation entry storage having a predetermined number of storage locations for storing at each of the storage locations at least a virtual memory address page number and a corresponding physical memory address page number; a comparing circuit for comparing a virtual memory address page number, generated in response to a first memory read or write operation of the microprocessor, to the stored virtual memory address page numbers for determining if one of the stored virtual memory address page numbers equals the generated number; and circuitry, responsive to the operation of the comparing circuit determining that one of the stored virtual memory address page numbers equals the generated number, for replacing the generated virtual memory address page number with the corresponding stored physical address page number such that the first address bus transmits the corresponding physical memory address page number to the first memory. Only predetermined ones of the address translation entry storage locations are responsive to a first logic state of a predefined bit or bits of predetermined ones of the microinstructions for having one of the virtual memory address page numbers and one of the physical memory address page numbers stored within at a storage location which corresponds to a location least recently used for translating a virtual memory address to a physical memory address.

In accordance with one more aspect of the invention there is disclosed a microprocessor having an address bus that includes a predetermined number of signal lines for expressing a predetermined maximum memory address value, the microprocessor also having an address generation unit that includes circuitry, responsive to a logic state of a predetermined bit or bits of predetermined ones of microinstructions, for generating an address having a maximum value which is less than the predetermined maximum memory address value.

There is also disclosed, in accordance with a still further aspect of the invention, a data processing system having a microprocessor that includes an arithmetic/logic execution unit for performing arithmetic and/or logical operations on data in response to one or more microinstructions corresponding to a macroinstruction; a memory interface for reading data from a first memory and for storing data within the first memory, the first memory means storing at least data and macroinstructions. The memory interface includes a first address bus and a first data bus, the first data bus being operably coupled at least between the arithmetic/logic execution and the first memory. The microprocessor further includes a macroinstruction decoding, coupled to the first data bus, for decoding into a corresponding microinstruction or microinstructions the macroinstructions read from the first memory means. The macroinstruction decoding circuit includes a second memory disposed external to the microprocessor for storing the microinstructions; circuitry for converting a macroinstruction into an address within the second memory of a corresponding one or ones of the microinstructions; a second address bus coupled between the converting circuit and the second memory for providing the address to the second memory; and a second data bus coupled between the second memory and the arithmetic/logic execution unit for reading in an addressed microinstruction for controlling the operation of at least the arithmetic/logic execution. The data processing system further includes circuitry, coupled to the second data bus, for receiving and decoding the microinstructions as they are read into the microprocessor. The receiving and decoding means may be a coprocessor means operable for executing one or more instructions independently of the microprocessor, the coprocessor being coupled at least to the first data bus for receiving data from and sending data to the first memory. In accordance with the invention the memory interface further includes circuitry, responsive to a logical state of a predefined bit or bits of predetermined ones of the microinstructions, for generating an address on the first address bus and a write strobe signal to the first memory and wherein the coprocessor sends data to the first memory for storage at an address specified by the generated address.

BRIEF DESCRIPTION OF THE DRAWING

These and other aspects of the invention will be made more apparent in the following Detailed Description of a Preferred Embodiment read in conjunction with the accompanying drawing wherein:

FIG. 2d is a block diagram of the Memory Management Unit (MMU) 18 of FIG. 2a;

FIG. 11b shows in more detail the format of the page frame entry of the ATE of FIG. 11a; and FIGS. 12a–12d show various aspects of the timing states of the microprocessor 10.

DETAILED DESCRIPTION OF A PREFERRED EMBODIMENT

As an aid in describing the microprocessor of the invention the description has been partitioned into several sections, each being designated by a reference letter (A–E). These sections are:
- A. Architecture
- A1. Register Set
- A2. Arithmetic Execution Unit
- A3. Status Register
- A4. Instruction Fetch
- B. Microinstruction Set
- C. Address Translation
- D. Processing States and Timing
- E. External Interface

A. ARCHITECTURE

Figure 1:
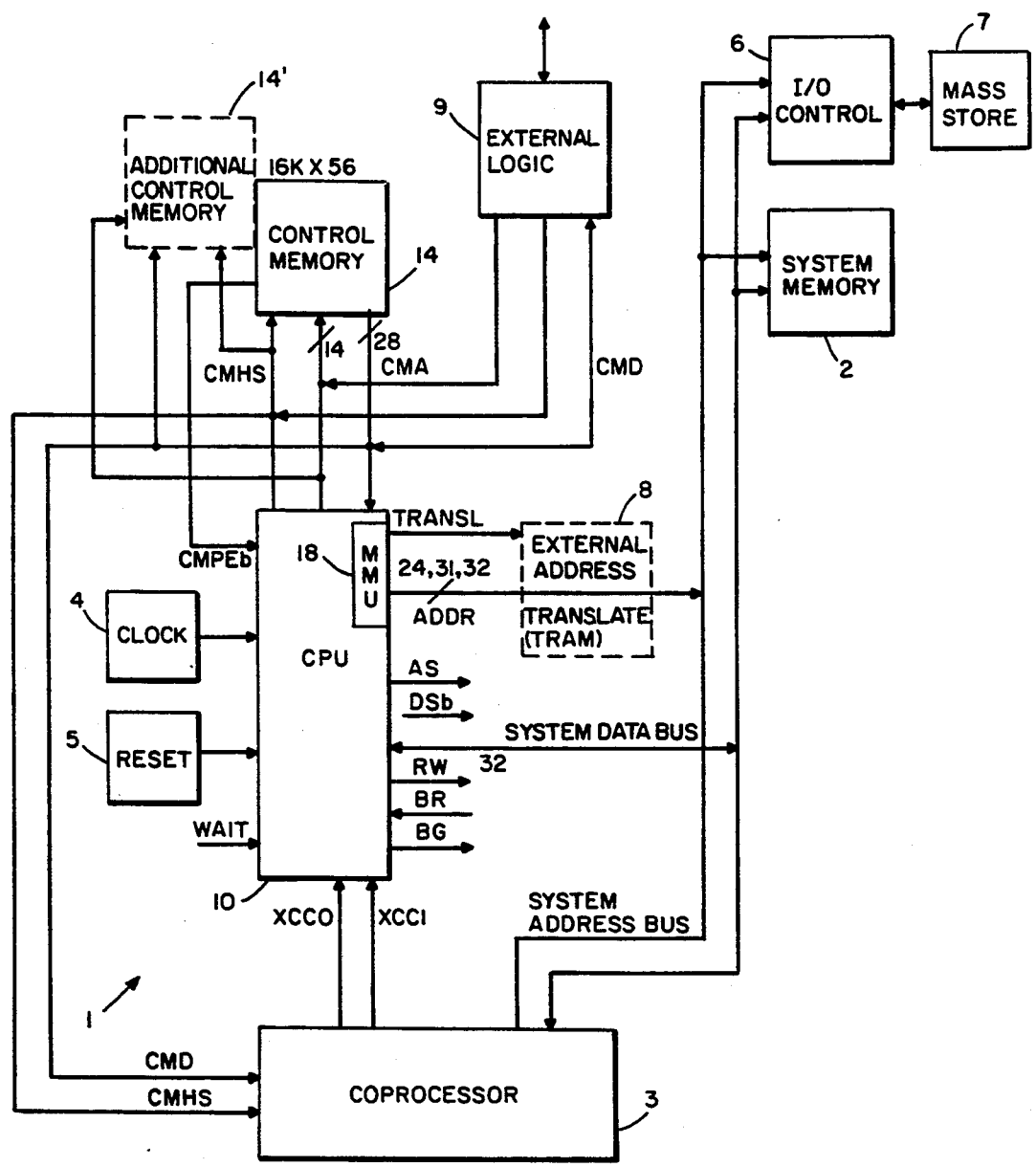
FIG. 1 is a block diagram showing a data processing system 1 having a CPU 10 which is constructed and operates in accordance with the invention.

Referring to FIG. 1 there is shown in block diagram form a data processing system 1 having a Central Processing Unit (CPU 10) constructed in accordance with the invention. CPU 10 in general executes assembly language statements which, in a preferred embodiment of the invention, are Virtual System (VS) assembly language statements of Wang Laboratories, Inc. of Lowell, Mass. CPU 10 is designed to efficiently execute the VS assembly language instructions set; however, it can also be used as a general-purpose microprocessor. CPU 10 in the preferred embodiment of the invention is fabricated in a 2-micron CMOS process; the chip itself being housed in a 144-pin grid array package. However, the teachings of the invention may be practiced with other microprocessor devices fabricated with any suitable processing and packaging technology.

Programs are written in the VS Assembly Language, or macroinstructions. The macroinstructions, which are described in the *VS Principles of Operation*, copyright 1983 by Wang Laboratories, Inc., call up routines composed of microinstructions. CPU 10 processes the VS macroinstructions and executes the corresponding microinstructions.

To increase the speed of macroinstruction processing CPU 10 fetches the macroinstructions in sequence from a system memory 2 and places them in an internal prefetch buffer. The prefetch buffer stores up to four 32-bit full-words, one of which is considered to be the current instruction. If the current macroinstruction requires a program control branch, the contents of the prefetch buffer are replaced with the specified instructions. The microinstructions that execute the functions requested by the macroinstructions are stored in a control memory 14 which, in accordance with one aspect of the invention, is external to the CPU 10 whereby the microinstructions may be accessed by external logic 9 and, if desired, loaded, read and/or modified. External access to control memory 14 preferably occurs during a time when the control memory address and data lines are in a high impedance state, such as during a reset or wait state condition. External logic 9 may be another microprocessor and/or other circuitry coupled to the control memory address and data lines and which is operable for accessing memory locations within the control memory 14. The microinstructions may be loaded from, for example, a magnetic disk or from data received by a communications bus from a local or remote location.

Typically, a macroinstruction requires multiple microinstructions to complete the requested operation, but many macroinstructions require only one microinstruction. The address of the current macroinstruction's microinstruction routine is calculated from the macroinstruction's operation code (opcode). CPU 10 fetches the microinstruction routine from the calculated address and executes the microinstruction(s). Control logic routes the microinstruction operands from CPU 10's internal registers or memory interface to an Arithmetic and Logic Unit (ALU), which includes a pseudo-barrel shifter, and returns the results to the appropriate register or to external memory. After the microinstruction routine is executed, control branches to the next macroinstruction to be processed, and the above sequence begins again. A more detailed description of the execution of macro and micro instructions will be provided hereinafter.

System 1 also comprises a 32 bit system data bus and a 32 bit system address bus which couples CPU 10 to the system memory 2 and also, in some embodiments of the invention, to external acceleration logic such as a coprocessor 3. System 1 also typically comprises a clock generator 4 and a reset generator 5 which provide timing and initialization signals, respectively, to CPU 10.

In accordance with aspects of the presently preferred embodiment of the invention, coprocessor 3 may be coupled to the output of control memory 14 for directly receiving and decoding the microinstruction stream as it is fetched for execution by CPU 10. The coprocessor 3 may also be coupled, via CPU 10 input signal pins XCC0 and XCC1, to CPU 10 whereby coprocessor 3 is enabled to directly set the contents of a condition code register within CPU 10. These aspects of the invention provide for a tightly coupled, synchronous CPU/coprocessor interface. CPU 10 is also provided with bus request and bus grant signal lines which provide for a loosely coupled, asynchronous CPU/coprocessor interface. Furthermore, the coprocessor 3 may be coupled to the system data bus such that, in accordance with one aspect of the invention, coprocessor 3 may read data from or store data within the system memory 2 at an address provided by CPU 10. This aspect of the invention will be discussed below.

System 1 may also comprise an I/O controller 6 which is coupled to the system bus and is also coupled to a mass storage device 7 for transferring data and programs between the mass storage device and the system memory 2. Other I/O controllers (not shown) may couple data communications devices, operator keyboards and similar apparatus to the system 1.

CPU 10 also comprises an internal memory management unit (MMU) 18 which may be selectively enabled or disabled from translating virtual memory addresses into physical addresses. If the internal MMU 18 is not employed an optional external address translation unit 8 may perform the address translation.

Referring now to FIGS. 2a–2d there is shown a block diagram of CPU 10. CPU 10's internal architecture includes an Arithmetic Execution Unit (AEU) 12, a prefetch buffer 16, and the internal Memory Management Unit (MMU) 18.

The AEU 12 includes a 32-bit binary Arithmetic Logic Unit (ALU) that performs logical and binary arithmetic operations, an ALU that performs eight bit binary-coded decimal (BCD) operations, a 64-bit pseudo-barrel shift register, and various other registers which are not shown in FIG. 2.

In accordance with one aspect of the invention, the architecture of CPU 10 enables CPU 10 to support either 24, 31 or 32 bit external addressing.

Externally, and in accordance with another aspect of the invention, CPU 10 employs the 56-bit-wide control memory 14. CPU 10 has 14 control memory address (CMA) lines enabling the addressing of up to 16K locations of stored microinstructions.

CPU 10's internal architecture includes four buses: the A bus 22, B Bus 24, C Bus 26, and Effective Address (EA) Bus 28. The A Bus 22 provides a path from register operands and ROM to the ALU and the 64-bit pseudo-barrel shifter. The A Bus is also used to transfer immediate operands from the control memory 14 to the ALU shift register. The B Bus 24 provides a path from various register operands, including the memory address registers, to the ALU and shift register. The C Bus 26 routes the result of a AEU 12 operation back to the internal registers or to external memory. The EA Bus 28 is used to transfer memory addresses and provides a path for either a memory address register or a BD/BDX-generated address to the memory interface 30. The EA Bus also provides a path into the Effective Address Register (EAR) 32 which captures the memory address used during a given cycle.

A1. REGISTER SET

The functional register blocks shown in FIG. 2 are described below in Table 1.

TABLE 1

| Register | Description |
|---|---|
| AEU 12 | Arithmetic Execution Unit. The AEU performs binary arithmetic and logical operations, binary-coded decimal operations, shift operations, and generates BD- and BDX-type effective address calculations. The AEU 12 also supports hardware assisted multiply and divide operations. |
| ATE Set 34 | MMU ATE Register Set. This register set contains four permanent and sixteen temporary registers, each of which contains translation information and a valid bit. |
| BDXR 36 | BD/BDX Register. The BDXR stores the base-plus-displacement (BD) or the indexed base-plus-displacement (BDX) sum from the ALU. |
| BMWR 38 | Branch Multi-Way Register. The contents of BMWR are used by some branching microinstructions as a portion of the branch address. |
| BSR 40 | Barrel Shift Register. The BSR stores the number of bit positions for the shifter to shift. |
| CH 42 | Current Half-Word. The CH register contains the half-word (2 bytes) of macrocode currently being decoded. |
| DISP 43 | Displacement. The DISP 43 stores a 16 bit address displacement for those macroinstructions which require sme. |
| EAL 106 | Effective Address Latch. The EA Latch holds the effective address for translation by the MMU 18. |
| EAR 32 | Effective Address Register. In the event of a trap condition, the EAR holds the faulting effective address. |
| FR 44 | File Registers. The file registers are 32 directly addressable registers that are accessible only by microcode (microinstructions). |
| GR 46 | General Registers. The general registers are 16 registers that are addressed by macrocode (macroinstructions). |
| IAD 48 | Instruction Address Register. The IAD maintains the starting address of the current macroinstruction. |
| IMAR 50 | Instruction Memory Address Register. The IMAR contains the address of the next instruction to be loaded into the |

TABLE 1-continued

| Register | Description |
|---|---|
| | prefetch buffer for possible future processing by CPU 10. |
| IREG 52 | Indirect Register. The IREG contains a pointer into the General Registers 46. |
| MAR0 54 | Memory Address Register 0. MAR0 points to the half-word (2 bytes) currently being processed by CPU 10. This half-word is part of the current macroinstruction. |
| MAR1 56, MAR2 58, | Memory Address Registers 1 and 2. MAR 1 and MAR 2 are general-purpose address registers which also autoincrement and decrement by +1, +4 and −4. |
| MDR 60 | Memory Data Register. The MDR contains the data read into CPU 10 from the system data bus. |
| PMR 62 | Program Mask Register. The PMR contains the condition codes that are set as a result of certain conditions imposed by the condition code (CC) field of a microinstruction, as shown in Table 8 below. |
| ROM 64 | Read-only Memory. The ROM contains constants that are used by CPU 10 during operation. The ROM 64 has outputs coupled to both the A bus 22 and B bus 24 and is addressed by selected bits of microinstructions which employ the constants stored within the ROM 64. One feature of ROM 64 is that for a given address ROM 64 can provide an output to either the A bus or the B bus, the output data not necessarily being the same. For example, the ROM address 2 may provide the pattern $FFFFFFFF_{16}$ to the A bus while if the B bus is the destination the ROM may provide the pattern $55555555_{16}$. Such patterns are utilized generally by the AEU 12 for masking and as fill patterns for shift operations. |
| RING REG 66 | Ring Register. A ring is a three bit unsigned integer that indicates the process level of the current process. The value of the RING REG 66 is used to determine the occurrence of protection violations. |
| XREG 78 | Index Register. The XREG is used for indexed address calculations. |
| XL 68 | XL is a 32 bit register which for multiplication stores the multiplier and the least significant word of the product after the multiply. XL 68 is also used for divide operations. |
| XR 69 | XR is a 32 bit register on the A bus side of the AEU. XR stores the most significant word of a partial product. XR 69 is also used for divide operations. |
| SR 70 | Status Register. The SR has 32 status bits for indicating the results of various operations and for modifying or conditioning the results of other operations. The SR 70 is shown in Table 2 below and in further detail in FIG. 2e. |
| RAM Stack | A CPU 10 internal RAM Stack register file is made up of a directly addressable 32-word by 32-bit structure (FR 44) and a 16-word by 32-bit indirectly addressable structure (GR 46). 256 full-words of externally provided register file are addressed via bits 24–31 of the selected MAR in the XRF addressing space, as will be described below. |

A2. ARITHMETIC EXECUTION UNIT

The Arithmetic Execution Unit (AEU) 12 comprises arithmetic/logic units (ALUs) and supports 32-bit binary operations, supports both 8-digit and 2-digit BCD operations, provides a 64-bit pseudo-barrel shifter, provides required status information (binary carry, decimal carry, overflow, zero, sign, carry from bit 21, and invalid BCD digit), supports full-word and half-word multiplication, supports full-word division, and to also functions as an address generation unit.

The Binary Coded Decimal (BCD) ALU complements the main binary ALU and shifter, and accepts the same operands (A, B, and C Buses). Its activation is caused by a family of BCD process field opcodes, as will be described.

The BCD ALU accepts 32-bit values, eight 4-bit BCD digits (long operations), or two 4-bit BCD digits with the remaining bits zeroed (short operations) from the A and B Buses and generates a 32-bit output that is driven onto the C Bus. For the short BCD ALU, the upper three bytes of the output to the C Bus are zeros.

For subtraction, the nine's complement of the A Bus value is added to the B Bus value. The appropriate carry-in/borrow is determined by the process field opcode.

Status register (SR) 70 bits affected by the BCD ALU are ALU (SR 12), DCA (Decimal Carry-Out (SR 15), and DEC (Invalid Decimal Digit) (SR 18). The ALU status bit is reset to 0 when the BDC ALU operation generates an output of magnitude zero (i.e., a decimal 0 is driven onto the C Bus as a result of an operation). The DCA status bit corresponds to the CA (SR 13) status bit of the binary ALU. The DEC status bit (SR 18) is an error flag generated by the BCD ALU when the BCD ALU is activated and an illegal input digit is detected on the A or B Bus. A digit is considered to be illegal if its binary representation is 101x or 11xx, where x is a "don't care."

Two binary ALU operations are multiplication and division. Both full-word and half-word multiplication are implemented. Full-word multiplication takes two signed 32-bit quantities as input and produces a 64-bit product. The multiplication hardware implements Booth's Algorithm. Full-word multiplication uses four registers: XR69, YR69a, XL68 and SR70. The three opcodes related to multiplication are MDSET, MUL, and SQLP, as will be described.

Half-word multiplication (HMUL) multiplies a signed 16-bit multiplier by a signed 32-bit multiplicand and produces a signed 48-bit product. The multiplier is obtained from the least significant half-word of the XL register. The multiplicand is obtained from the A-bus operand. The C-bus result of HMUL is the most significant 32 bits of the product. HMUL stores the least significant bits of the product in the most significant half-word of the XL register 68.

Division takes a 64-bit dividend and a 32-bit divisor and produces a 32-bit quotient and a 32-bit remainder. Division uses the same registers as multiplication: XR, YR, XL and SR. The three opcodes related to division are MDSET, SQLP, and DIV.

After a division operation, the specified C Bus operand contains the remainder and XL 68 contains the unadjusted quotient. The SGN status bit indicates the sign of the remainder. The remainder may require firmware adjustment after the DIV operation. The firmware adjustment is described as follows: If the sign bit of the remainder is 1, then add the divisor to the stored remainder to form the final remainder.

When dividing a large dividend by a small divisor, it is possible to generate a quotient overflow, which indicates that the quotient has exceeded a 31-bit positive value. Quotient overflow may be detected in two ways. First, overflow is indicated if the divisor is less than or equal to the most significant word of the dividend. If this is not the case, overflow has occurred if the quotient is negative.

A3. STATUS REGISTER

CPU 10 comprises the 32-bit status register (SR)70 having bits numbered SR0-SR31. Bit manipulation operations and conditional branching are available for all status bits. All status bits are set to zero by POR (Power-On Reset).

Figure 2A:
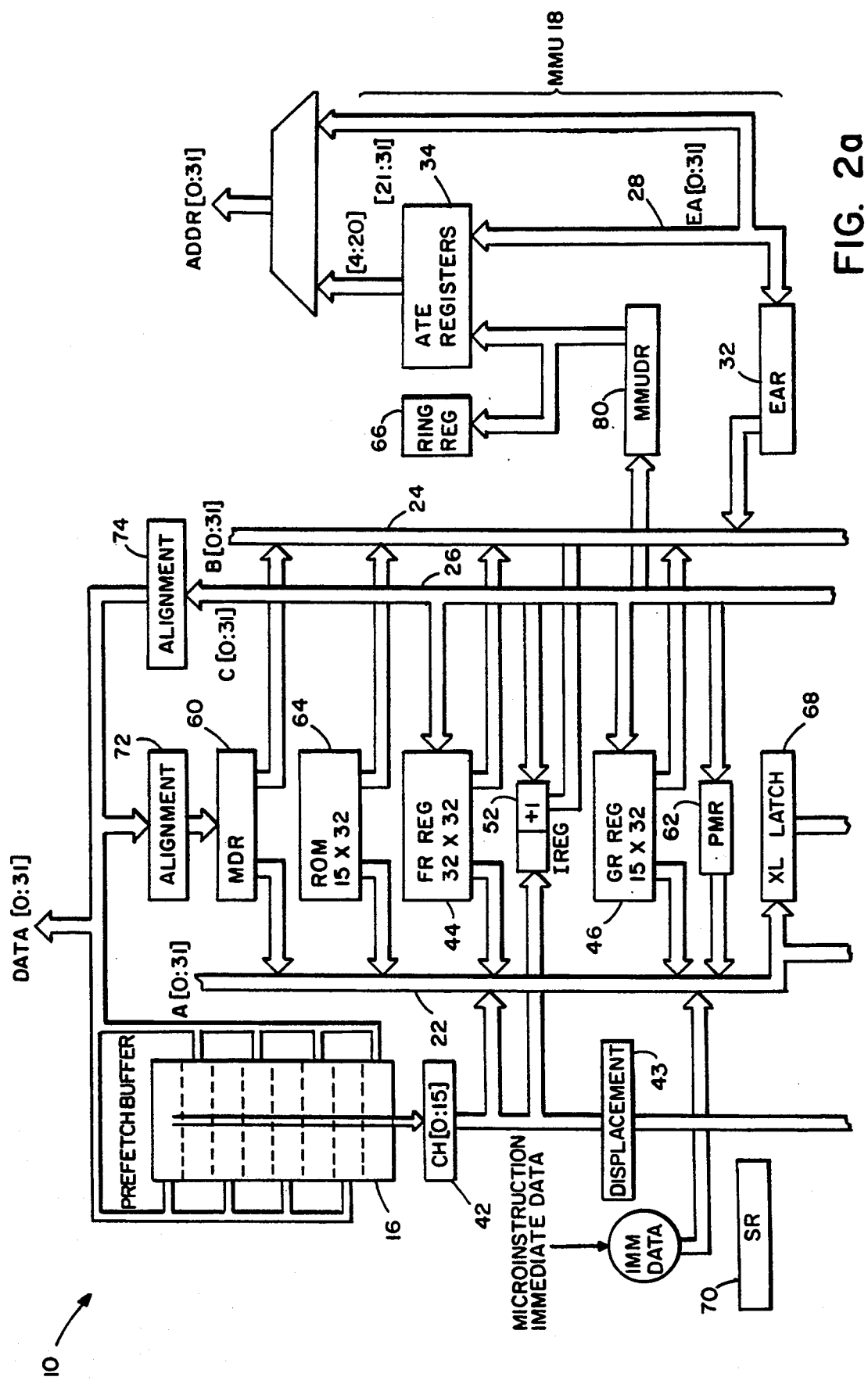
FIGS. 2a and 2b are a block diagram of internal registers and buses of the CPU 10.
Figure 2B:
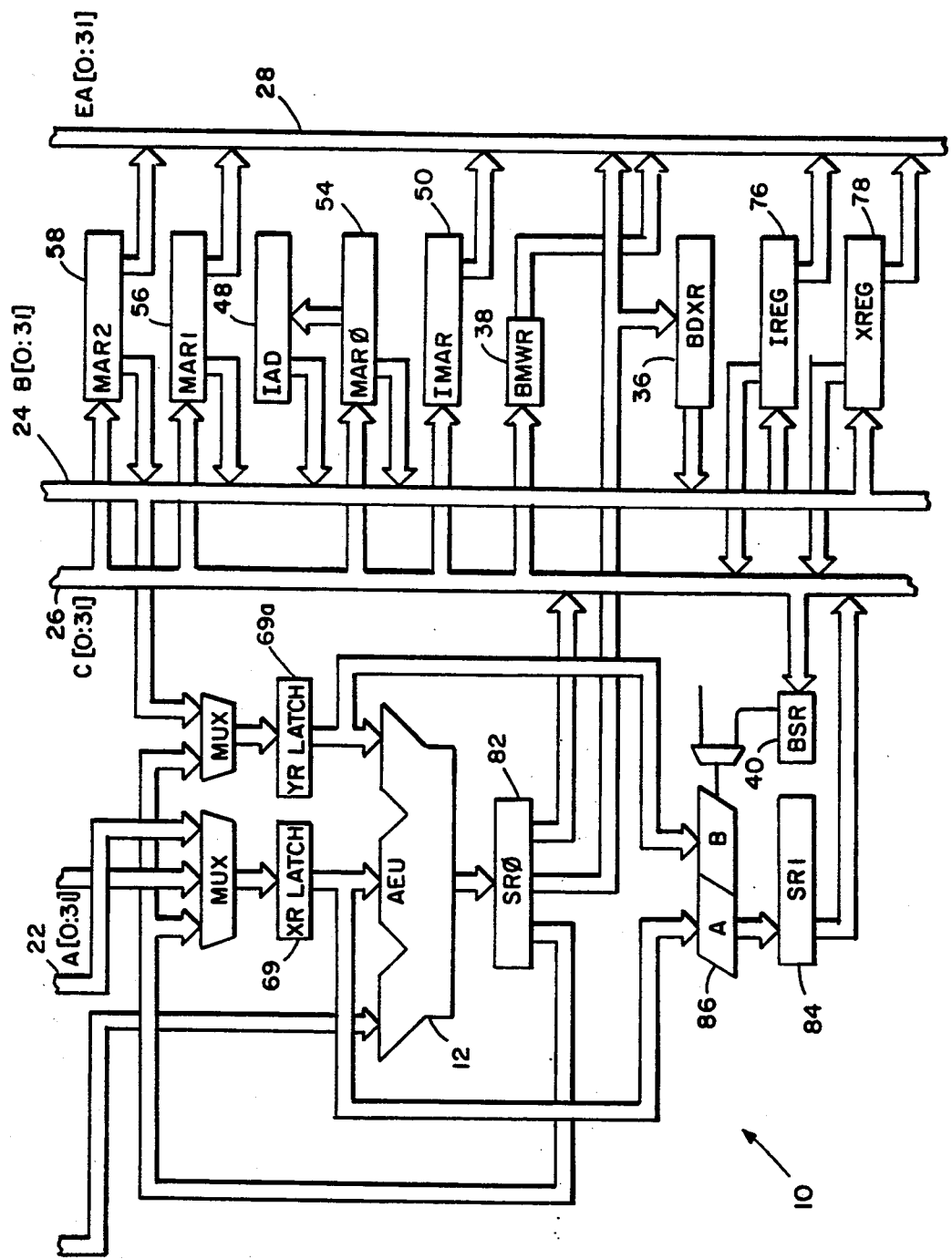
Figure 2C:
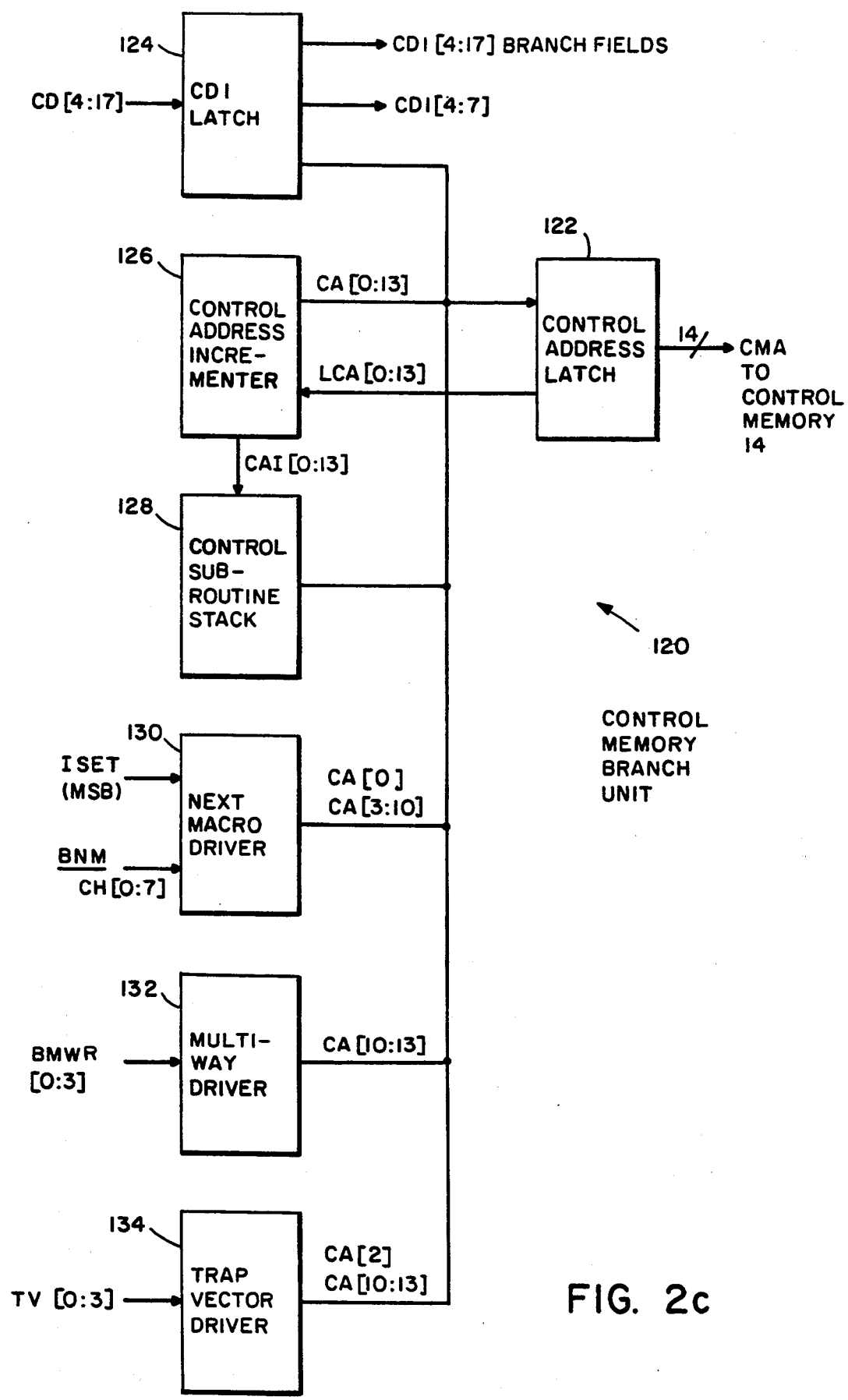
FIG. 2c is a block diagram of a Branch Unit of the CPU 10.
Figure 2D:
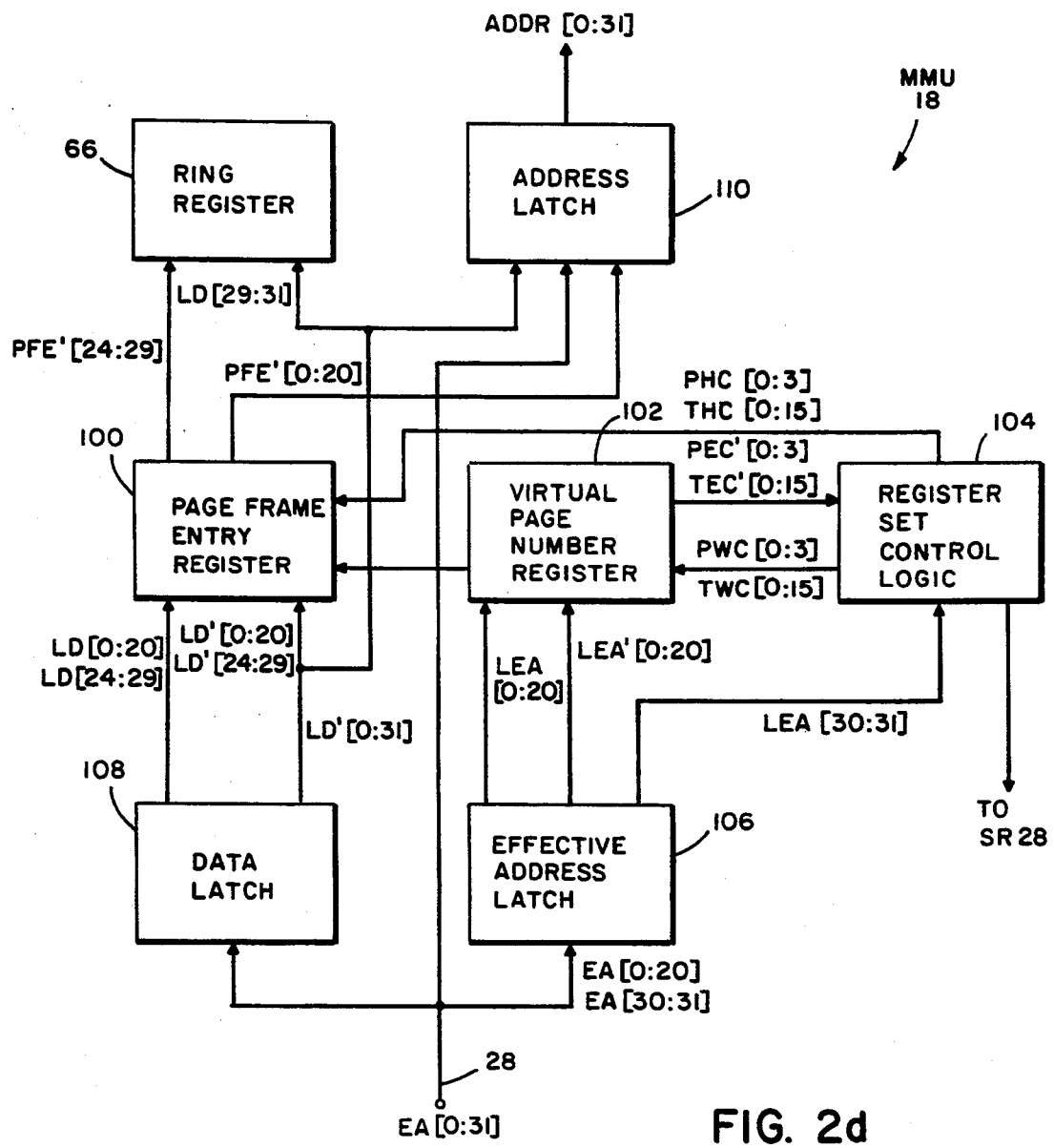
Figure 2E:
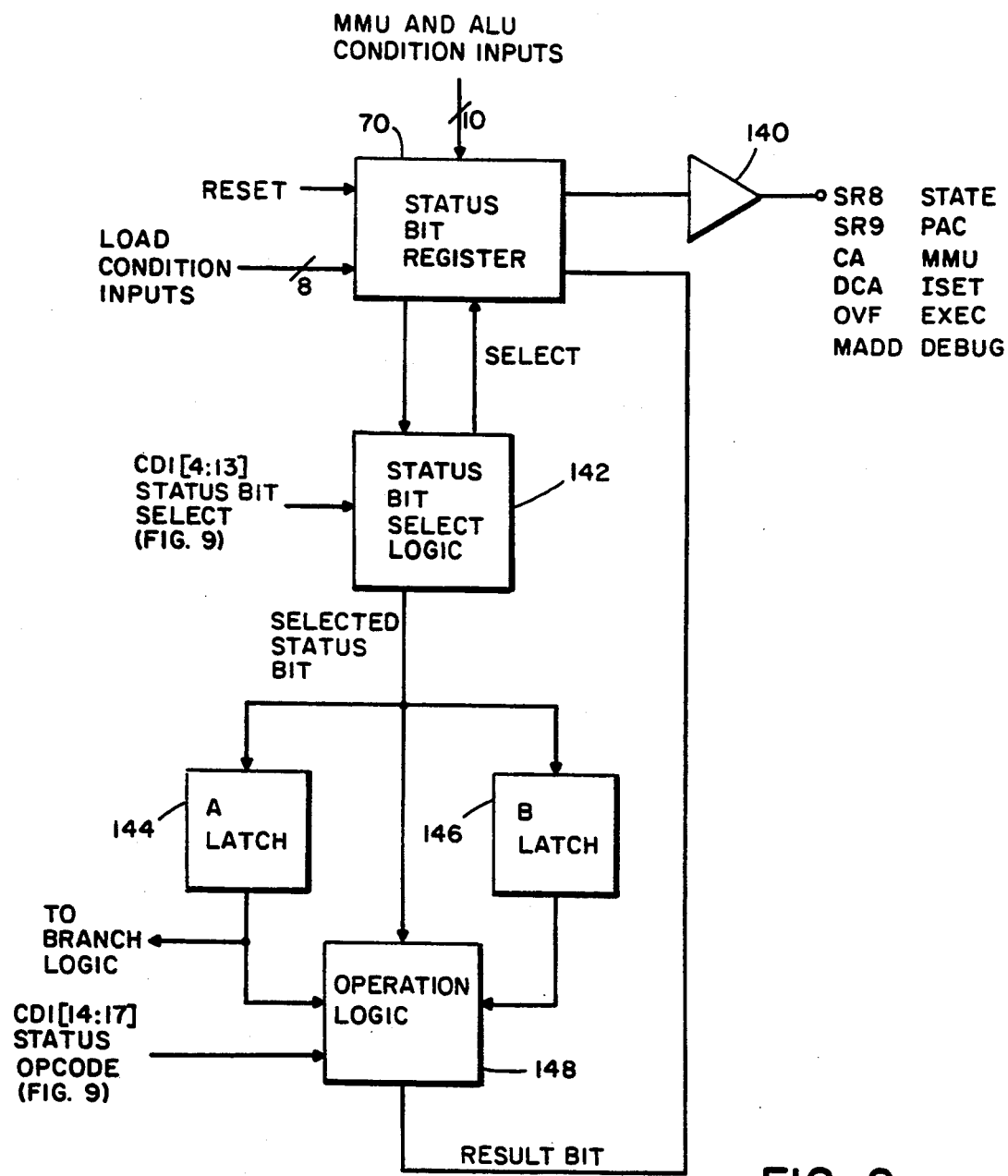
FIG. 2e is a block diagram of the Status Register 70 and associated logic.

Referring now to FIG. 2e there is shown in block diagram form the status register 70 and associated logic. Status register 70 comprises a 32 bit register having a plurality of condition inputs which originate in the AEU 12 and the MMU 18. These inputs are related to the condition of status bits ALU (SR12), CA (SR13), PCA (SR14), DCA (SR15), SGN (SR26), OVF (SR17) , ALW (SR19), ALH (SR20), M2S (SR21) and MMISS (SR28). A plurality of load condition input signal lines are also provided for latching in the state of status bits at an appropriate time in a cycle. Outputs of SR70 are applied to a buffer, shown schematically as the buffer 140, which outputs those status bits which are applied to other logic within the CPU 10. For example, the ISET (SR29) bit is applied to the control memory branch unit (FIG. 2c).

A status bit select logic block 142 receives microinstruction CD1 bits [4:13] (FIG. 9) and sequentially selects status bits for operations. A select output is applied to SR 70 and the selected bit is applied to an A latch 144, a B latch 146 or directly to an operation logic block 148. Operation logic block 148 also receives as inputs microinstruction CD1 bits [14:17] (FIG. 9) which define the type of operation to be performed upon the selected bit(s) as shown in Table 12 below. The output of A latch 144 is also applied to branch control logic as a qualifying input for those branch instructions which test a status register bit, for example BF and BT (Table 9).

The result bit output of operation logic block 148 is applied to status register 70 for storage within the selected status bit.

Table 2 describes the function of each status bit. In accordance with another aspect of the invention, each of the 32 status bits are branchable. Thus, CPU 10 microcode may use any of the spare status bits (SR0-SR11) as branchable flags within routines.

TABLE 2

| Status Bit | Description |
| --- | --- |
| (SR0) SP0 | Spare bit 0 |
| (SR1) SP1 | Spare bit 1 |
| (SR2) SP2 | Spare bit 2 |
| (SR3) SP3 | Spare bit 3 |
| (SR4) SP4 | Spare bit 4 |
| (SR5) SP5 | Spare bit 5 |
| (SR6) SP6 | Spare bit 6 |
| (SR7) SP7 | Spare bit 7 |
| (SR8) SP8 | Spare bit 8. SP8 is also used in the formulation of condition code CCS. |
| (SR9) SP9 | Spare bit 9. SP9 is also used in the formulation of condition code CCS. |
| (SR10) SP10 | Spare bit 10 |
| (SR11) SP11 | Spare bit 11 |
| (SR12) ALU | The ALU status bit is set to 1 to indicate a nonzero magnitude result from the AEU. The ALU status bit is set to 0 to indicate a zero magnitude result from the AEU. |
| (SR13) CA | The CA status bit is the carry-out and is also one of the carry-in choices for |

TABLE 2-continued

| Status Bit | Description |
|---|---|
| | binary arithmetic operations (binary addition and subtraction). The CA status bit is set equal to the carry-out of bit 0 at the end of these operations. |
| (SR14) PCA | The PCA (Page Boundary Carry-Out) status bit is affected by binary addition and subtraction operations. The PCA status bit is set to the carry-out from the 11th rightmost bit (bit 21) of the C Bus. |
| (SR15) DCA | The DCA status bit is the carry-in and is also the carry-out bit for decimal addition and subtraction process field operations. The DCA status bit is set to 1 by four decimal process field opcodes (DAC, DACZ, DSC, and DSCO). |
| (SR16) SGN | The SGN status bit indicates whether a particular 32-bit value is positive or negative. The SGN status bit is set equal to C Bus [0] by the AND, OR, XOR, and shift families of opcodes. It is also affected by the opcodes SQLP, MUL, and DIV. |
| (SR17) OVF | The overflow condition is affected by binary arithmetic operations. The OVF status bit is set to 1 when the carry-in to result bit 0 is different from the carry-out of bit 0. Otherwise, OVF is set to 0. |
| (SR18) DEC | The DEC status bit is set to 1 if a decimal operation (DAC, DACZ, DSC, or DSCO) encounters an invalid digit (A-F) in either the A or B Bus operand. The DEC status bit is not affected by the hardware when invalid digits are not encountered. The microcode must preset DEC to 0 before testing decimal digits; the hardware never sets DEC to 0. |
| (SR19) ALW | The ALW (Full-Word Alignment) status bit is used to check full-word alignment. The ALW status bit is set equal to MARx[30] 0Red with MARx[31] whenever MARx is used as a C Bus operand. (MARx represents MAR0, MAR1, or MAR2.) |
| (SR20) ALH | The ALH (Half-Word Alignment) status bit is used for half-word alignment checking. The ALH status bit is set equal to MARx[31] whenever MARx is used as a C Bus operand. |
| (SR21) M2S | The M2S status bit is affected during a cycle in which MAR2 is specified in the Address Select field. M2S is set to 1 only when one of the following conditions occurs: MAR2 = 0 and is decremented; MAR2 = FFFFFFFFH and is incremented by 1; or FFFFFFFH ≦ MAR2 ≦ FFFFFFFFH, and MAR2 is incremented by 4. M2S is set to 0 on all other operations in which MAR2 is the selected address. When a cycle that specifies MAR2 in the Address Select field immediately follows a cycle in which MAR2 was used as a C Bus operand, M2S is set as described above but the current ripple operation and the previous MAR2 value are used. During a normal cycle both the current ripple operation and the current MAR2 value are employed.) |
| (SR22) MADD | The MADD status bit indicates, in accordance with one aspect of the invention, the mode of addressing. A one indicates 31-bit addressing and a zero indicates 24-bit addressing. Also, MADD being a one causes ACT process field operations and BD/BDX memory field operations to zero the most significant bit of the C Bus result. MADD being a zero causes ACT process field operations and BD/BDX memory field operations to zero the most significant byte of the C |
| | Bus result. |
| (SR23) STATE | The STATE status bit specifies either a user state or a system state. The user state is indicated by STATE being set to one; the system state is indicated by STATE set to zero. The CPU 10 uses the STATE bit to check for write-protection violations during write memory operations (protection trap on write if STATE = 1 and the WP bit (in MMU entry) = 1). STATE = 1 also enables protection violation (PIVOM) traps. The STATE bit is unmodified by the hardware. A copy of the STATE bit is provided for external use to the aforementioned support logic. |
| (SR24) VM | The VM (Virtual Machine) status bit is set by the firmware to reflect the condition in PCW. |
| (SR25) VMPC | VM PHYS Control status bit. VMPC equaling one indicates that the outgoing address is to be physical and, therefore, the MMU 18 or external translation logic should be bypassed. No part of the MMU 18 is changed when VMPC is set to 1. When both PHYS (SR26) and VMPC equal 0 the outgoing address is virtual and requires translation. VMPC is also used in the formulation of the state of the TRANSb (translate) pin output. |
| (SR26) PHYS | Physical status bit. PHYS = 1 indicates that the outgoing address is to be physical, and therefore the MMU 18 or external address translation logic should be bypassed. No part of the MMU 18 is changed when PHYS is set to 1. PHYS is also used in the formulation of the state of the TRANSb pin output. |
| (SR27) MMU | The MMU status bit equaling a one enables virtual address translation by the MMU 18. The MMU status bit equaling a zero disables MMU 18 address translation. |
| (SR28) MMISS | MMU Miss status bit. MMISS equaling zero indicates an MMU 18 hit of the effective address for a microinstruction. Otherwise, MMISS equals 1. After a memory field WIPE, as described below in the WIPE microinstruction, MMISS equalling a zero indicates that a different or additional entry existed having the same virtual address information; therefore, the operation was not successful. MMISS equalling a one indicates that no other entry existed with the same virtual address information. |
| (SR29) ISET | The ISET status bit is used by microinstructions to control the high-order bit for the 14-bit multi-way microinstruction address created by BNM. For normal execution, the microcode keeps ISET set to zero. |
| (SR30) EXEC | The EXEC status bit is a BNM-time trap bit. The microcode sets EXEC to a one before leaving an EXECUTE instruction via BNMX. EXEC is checked on entry into an EXECUTE instruction to ensure that there are no nested EXECUTES. The firmware must reset EXEC to zero during the BEX BNM-time trap and whenever MAR0 is a C Bus operand. |
| (SR31) DEBUG | The DEBUG status bit is a firmware-controlled BNM-time trap bit. A BNM-time trap is activated if DEBUG is set to a one. |

A4. INSTRUCTION FETCH

Instruction fetch and preparation of macroinstructions generally uses five registers, namely IMAR 50, MAR0 54, IREG 76, IAD 48, and CH 42.

The microinstructions associated with macroinstruction fetch and preparation are IF, BD, BDX, BNM, CH and CHREL. IF is a memory field opcode that fills the prefetch buffer. BD and BDX are memory field address selections that deplete the prefetch buffer. BNM is a branch field opcode that also depletes the prefetch buffer. CH and CHREL are A Bus 22 operands that deplete the prefetch buffer.

CPU 10's instruction prefetch logic comprises a circular prefetch buffer 16. The buffer 16 consists of four 32-bit full-word entries. The microcode memory field opcode IF initiates instruction fetches (IFetches), but IFetches are performed by the hardware. There are two pointers associated with the circular prefetch buffer 16. The write pointer is derived from IMAR[28:29]. For a normal IFetch, the memory read data located at IMAR's full-word virtual address is loaded into the prefetch buffer 16 at the write pointer location. An associated valid bit is set to 1, and the buffer entry is ready for subsequent consumption. A read pointer is derived from MAR0[28:29]. MAR0 [30] determines which half-word of the full-word indicated by the read pointer is to be the current half-word, that is the 16 bits that are next in line to be processed.

MAR0 54 always points to the current half-word, except for a brief transition period (during buffer entry consumption). At BNM-time (when interpretation of the next macroinstruction begins), MAR0 54 provides the least significant byte of the current half-word into IREG 52 and provides the most significant byte to branch logic. When MAR0 54 is a C Bus 26 operand, IFetches and buffer entry consumption are considered to be illegal operations. A multi-way branch to the corresponding microinstruction stored within control memory 14 occurs instead. MAR0 54 is used as a C-Bus 26 operand before any operations involving the prefetch buffer 16 occur in order to clear the valid bits.

The BNM family of branch field opcodes, the CH and CHREL A Bus operands, and the BD and BDX memory field opcodes each consume one half-word and cause MAR0 54 to ripple (increment) by +2. When consumption is mandated by CH, CHREL, BD, BDX, or BNM-type operations, the following events occur, wherein one half-word consumption operation is allowed per microinstruction. If the full-word buffer entry is consumed, the valid bit indicated by MAR0 54 is reset to 0; the new current half-word is latched; and MAR0 54 is rippled +2 to point to the next half-word.

IFetches are inhibited when the buffer 16 is considered full, that is, when IMAR 50 points to a location having a valid bit set to a one. IFetches and IMAR ripples are also inhibited after an IFetch Fault until MAR0 54 is reloaded. Whenever an IF is issued for a prefetch buffer that is already full, that IF will be ignored by the hardware. Whenever MAR0 54 is used as a C Bus 26 operand IMAR[0:29] receives C[0:29] while IMAR [30:31] remain at zero, all prefetch buffer valid bits are reset to zero, and IFLT is reset.

There are two types of IFetch trap-handling mechanisms, namely immediate (normal) and delayed (PBE). The issuance of an invalid address (INVA) or the occurrence of a parity error (MPAR) during IFetch is considered to be an unrecoverable error from a microcode standpoint and, thus, these occurrences generate an immediate trap.

The handling of fault conditions, such as translation faults or protection violations, occurring during IFetch are postponed until that address is actually encountered in instruction-stream processing. In this way, instruction fetches may be performed during BNM without the possibility of the IF causing a restart of the entire macroinstruction. These delayed traps are controlled in accordance with the following three methods:

1. In the event of a fault condition during prefetch, the IFLT signal is activated. IFLT inhibits subsequent IFetches and the setting of any prefetch buffer valid bit to 1.
2. At the access or consumption of each half-word, the hardware checks the appropriate valid bit.
3. If the appropriate valid bit is a 0, exception processing is required. If a BNM operation is in progress, a BNM-time trap is signaled; otherwise, a trap is signaled.

In the event of a process-level violation during an IFetch, the STATE bit (SR23) is checked when the MMU 18 is enabled. For a system using external translation logic 8, the external STATE bit in the external logic is checked. If the STATE bit is 0, indicating the system state as opposed to the user state, IFLT is ignored; otherwise, traps are handled as described above in steps 1–3.

Since IF extends into the middle of a following microcycle and prefetch buffer 16 entry consumption starts at the beginning of the current microcycle, the first IFetch after the prefetch buffer 16 is emptied occurs at least two microcycles before a consumption in order to be valid for that consumption.

The instruction fetch hardware procedure is described below in Table 3. Both the effective address register EAR 32 and the MMISS (SR28) status bit are updated.

TABLE 3

| Step | Action |
| --- | --- |
| 1 | AT IFetch, issue the IMAR 50 address. |
| 2 | If all valid bits = 1 (the buffer is full), or any three valid bits equal 1 and the previous instruction was an IFetch (the buffer will be full), then abort the instruction fetch. Also, inhibit Ifetch related address strobe (AS), data strobe (DS) and data bus enable (DBEN) signal pin assertions and inhibit the setting of prefetch buffer valid bits until a prefetch buffer location is emptied. Or, if IFLT = 1, then inhibit all current and further IFetch related assertions of output signals AS, DS and DBEN. Also inhibit valid bit setting and future IMAR rippling until MAR0 54 is used as a C Bus operand. Exception processing will take place at the attempted consumption of the invalid buffer location. Otherwise apply the physical address to memory and read the full-word data; clock the data into the prefetch buffer 16 location pointed to by IMAR 50 and update the associated valid bit; then increment IMAR 50 by +4. |

B. MICROINSTRUCTION SET

Figure 3:
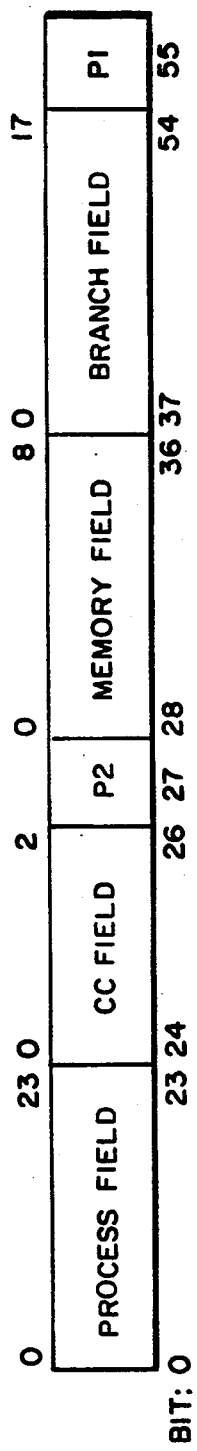
FIG. 3 shows the format of a microinstruction which is stored in the external control memory 14 and which directs the internal operation of the CPU 10, the microinstruction comprising a process field, a memory field, a condition code field and a branch field.

Referring to FIG. 3 it can be seen that microinstructions are 56 bits long and are comprised of four fields and two parity bits: the process field, condition code field, memory field, branch field, the parity high bit, and parity low bit. The microinstruction routine for each macroinstruction begins at an address that is a multiple of eight. A corresponding microinstruction routine's address within control memory 14 is determined by placing $00_2$ after the macroinstruction's 8-bit opcode. For example, the opcode for the MVI macroinstruction is $92_{16}$; therefore the corresponding microinstruction routine's address is $490_{16}$.

In accordance with an aspect of the invention, the control memory 14 wherein the microinstructions are stored is accessed 28 bits at a time, thereby decreasing by one half the number of input signal pins required.

Figure 4:
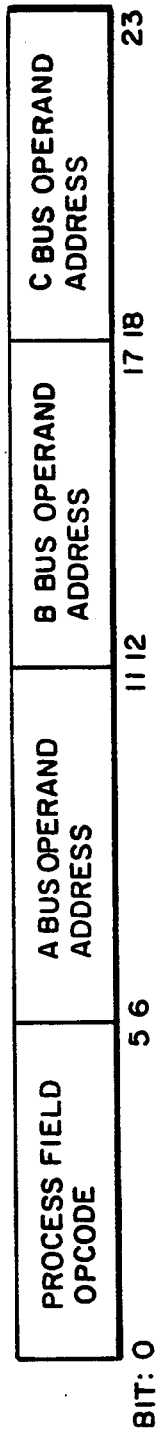
FIG. 4 shows in more detail the format of the process field of the microinstruction of FIG. 3.

The microinstruction process field is a 24-bit field that specifies the arithmetic, logic, and shift operations that are part of every microinstruction. The process field format is shown in FIG. 4.

Examples of the process field opcode are $14_{16}$ which causes the contents of the A Bus 22 to be exclusively ored with the B Bus 24. This operation affects status bits ALU (SR 12) and SGN (SR 16). This operation also affects the "forced live" bits LCA and LOVF. There are four live bits LALU, LSGN, LCA and LOVF, which affect condition code operations. These live bits are affected every microcycle according to their status bit definition unless they are "forced" in accordance with a particular process field opcode.

Another process field opcode is ACT ($1F_{16}$) which adds operands related to the address bus in accordance with the state of the MADD status bit (SR 22). If MADD is equal to one the most significant bit of the 32-bit result is set to zero. This results in the generation of a 31-bit address. If MADD is equal to zero the most significant byte of the 32-bit result is set to zero which results in, in accordance with an aspect of the invention, a 24-bit addressing capability. Thus, the addressing capability of the CPU 10 may be readily changed by changing the state of the MADD status bit.

The A Bus 22, B Bus 24, and C Bus 26 operands are each 32 bits in length. The operands for any entity less than 32 bits in length are formatted and filled. The A and B Bus operands are input to the AEU 12, and the result is stored in the C Bus operand. Immediate A Bus operand values are 8 bits long (Immediate[0:7]) and are found in Process[4:11]. All immediate values are input to the AEU via A[24:31]; A[0:23] are zero-filled.

The process field opcodes (bits 0:5) control the function of the AEU 12. In addition to arithmetic, logical, and shift opcodes, there are six opcodes for special instructions. The opcodes support both binary and decimal operations. Both binary and decimal operations are 32-bit operations.

Binary subtraction is a one's complement subtraction. Two's complement subtraction can be performed by setting CA (SR13) to one. Decimal subtraction is a nine's complement subtraction. Ten's complement subtraction can be performed by setting DCA (SR15) to one.

Four decimal operations (DAC, DACZ, DSCO, and DSC) result in 32-bit quantities. The Decimal Carry (DCA) (SR15) bit is used as the carry-out or carry-in. Decimal operations set the Decimal (DEC) bit (SR18) to one if an invalid digit (A-F) is encountered within the A or B Bus operand. Decimal subtraction is always a B Bus operand minus A Bus operand (B-A) operation, using the nine's complement of the A Bus operand.

The shift opcodes specify the number of bit positions that the 64-bit, pseudo-barrel shifter will shift the A and B Bus operands. The shifter has two 32-bit fields: the A field and the B field. The shifter places the A Bus operand in the A field and the B Bus operand in the B field. The concatenation is shifted left by the specified number of bit positions, and the resultant A field (i.e., the 32 most significant bits) is the shifter output.

For example, for a SHL4 opcode, the number of bit positions to be shifted is four; therefore, the output of the shifter is the concatenation of the 28 least significant bits of the A Bus operand with the four most significant bits of the B Bus operand (A[4:31] concatenated with B[0:3]). Each shift-left opcode has a corresponding shift-right opcode. To shift left, the quantity to be shifted is in the A field and the fill bits are in the B field. To shift right, the quantity to be shifted is in the B field and the fill bits are in the A field.

Figure 5:
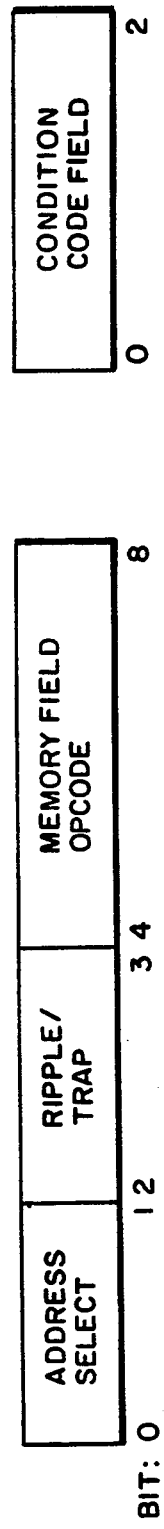
FIG. 5 shows in more detail the format of the memory field of the microinstruction of FIG. 3.

As can be seen in FIG. 5 and as described in Tables 4 and 5 the memory field is a 9-bit field consisting of three subfields: the address select subfield (Memory[0:1]), the ripple/trap subfield (Memory[2:3]), and the memory field opcode subfield (Memory[4:8]).

CPU 10 includes BD and BDX type of addressing. A base-plus-displacement (BD) address is generated as follows. The 12 least significant bits of the current half-word, or displacement, are zero-extended. The zero-extended current half-word is then added to the contents of the General Register that is pointed to by the four most significant bits of CH, or base register. If the base register is GR0, zero is added to the displacement.

An indexed base-plus-displacement (BDX) address is generated as follows. The BD sum is added to the contents of the General Register that is pointed to by the four least significant bits of XREG 66 (the index). If the least significant four bits of XREG 66 are zero, the BDX sum is equivalent to the BD sum. As has been previously stated, the MADD status bit (SR22) affects the BDX result as follows: if MADD=0, the most significant byte will be zeroed; if MADD=1, the most significant bit will be zeroed, thereby providing for 24 bit or 31 bit addressing capability.

The address generation hardware is incorporated into the AEU 12. The AEU and data path are used for BD and BDX address generation when they are not being used for process field operations. A 32-bit BD or BDX sum is computed whenever necessary, and a Wait/BDx timing state is inserted before the fetch of the BD(x) microcycle. CPU 10 timing states will be described in detail below in Section D.

For every microinstruction, an effective address is generated. The address select subfield controls the source of address for a microinstruction cycle. The ripple/trap subfield controls MAR rippling or full-word and half-word alignment traps as shown in Table 4. If Memory[O] is low, Memory[1] selects either MAR1 or MAR2 as the source of the outgoing address, and the ripple/trap subfield controls how the selected MAR is rippled (incremented). When Memory[O] is high, Memory[1] determines whether the BD or the BDX address is generated, and the ripple/trap subfield (Memory[2:3]) controls trap enabling. Full-word alignment trap (FAT) becomes active if either EA[30] or EA[31] is set to 1. The half-word alignment trap (HAT) becomes active if EA[31] is set to 1.

TABLE 4

| Memory Field [0:3] | Outgoing Address Selection | Ripple/Trap |
|---|---|---|
| 0 0 0 0 | MAR1 | MAR1 is not rippled |
| 0 0 0 1 | MAR1 | MAR1 is rippled −1 |
| 0 0 1 0 | MAR1 | MAR1 is rippled +4 |
| 0 0 1 1 | MAR1 | MAR1 is rippled +1 |
| 0 1 0 0 | MAR2 | MAR2 is not rippled |

TABLE 4-continued

| Memory Field [0:3] | Outgoing Address Selection | Ripple/Trap |
|---|---|---|
| 0 1 0 1 | MAR2 | MAR2 is rippled −1 |
| 0 1 1 0 | MAR2 | MAR2 is rippled +4 |
| 0 1 1 1 | MAR2 | MAR2 is rippled +1 |
| 1 0 0 x | Generate BD address | FAT and HAT are disabled |
| 1 0 1 0 | Generate BD address | FAT is enabled |
| 1 0 1 1 | Generate BD address | HAT is enabled |
| 1 1 0 x | Generate BDX address | FAT and HAT are disabled |
| 1 1 1 0 | Generate BDX address | FAT is enabled |
| 1 1 1 1 | Generate BDX address | HAT is enabled |

It can be seen that the address select subfield selects the address that will drive the Effective Address (EA) Bus 28 and will thus load the EAR 32. The four sources of address are MAR1 56, MAR2 58, the BD/BDX sum 36, and IMAR 50. IMAR 50 is an address source when the instruction fetch (IF) opcode is issued.

The memory field opcode determines whether or not an address is driven off-chip. If the memory field opcode is a no operation (NOP), no address is driven off-chip.

The IF opcode supersedes the address selection subfield and gates the IMAR address to the EA Bus 28. Any other memory field opcode results in the effective address or translated effective address being driven off-chip.

The memory field opcodes thus specify the memory operations to be performed. There are three types of memory field operations: translation opcodes, internal MMU opcodes, and nontranslation opcodes. These opcodes are described below in Table 5.

TABLE 5
MEMORY FIELD OPCODES

| Memory field | Operation | | Opcode Type |
|---|---|---|---|
| 02 | IF | Instruction Prefetch | Translation Opcodes (opcode that can issue both virt and physical addresses) |
| 04 | RB | Read Byte | |
| 05 | WB | Write Byte | |
| 07 | WBND | Write Byte With No Data | |
| 08 | RW | Read Word | |
| 09 | WW | Write Word | |
| 0B | WWND | Write Word With No Data | |
| 0C | RH | Read Half-Word | |
| 0E | RHE | Read Half-Word With Sign Extension | |
| 10 | NOP | No Operation | No Operation Opcode |
| 11 | WIPE | Write Individual Permanent Entry | Internal MMU Opcodes (opcod that control the MMU 18) |
| 12 | DATE | Delete All Temporary Entries | |
| 13 | WITE | Write Individual Temporary Entry | |
| 15 | LRNG | Load Ring Register | |
| 16 | RTRAM | Read TRAM | Nontranslational Opcodes (opcodes that issue only physical addresses) |
| 17 | WTRAM | Write Tram | |
| 18 | TRCT | Text (Read) Reference and Change Table (RCT) | |
| 19 | RRCT | Reset RCT | |
| 1A | RCT | Receive from Coprocessor | |
| 1B | SCP | Send to Coprocessor | |

TABLE 5-continued
MEMORY FIELD OPCODES

| Memory field | Operation | | Opcode Type |
|---|---|---|---|
| 1C | RIO | Read I/O | |
| 1D | WIO | Write I/O | |
| 1E | RWX | Read Word From External Register File (XRF) | |
| 1F | WWX | Write Word to XRF | |

There are nine translational opcodes, that is, memory field opcodes that can issue either virtual or physical addresses. These are IF, RB, WB, WBND, RW, WW, WBND, RH, and RHE. If the address is to be physical, the PHYS status bit (SR26) must be set to 1 before the opcode is encountered to ensure that the virtual-to-physical address translation facility of MMU 18 does not translate the address. If the address is to be virtual, the PHYS status bit (SR26) is set to 0 to ensure that the virtual address is translated to a physical address. Table 6 describes the function of each of the translational opcodes.

TABLE 6
TRANSLATION OPCODES

| Opcode | Description |
|---|---|
| IF | Instruction Fetch. IF is a memory read operation that uses the address contained in IMAR 50. The data read is directed to the prefetch buffer 16 for subsequent macroinstruction decoding. |
| RB | Read Byte. RB reads the data from the byte address indicated by the address selection field. This byte of information is then gated by alignment logic 72 to the least significant byte of the MDR 60, and the three most significant bytes of the MDR 60 are set to zero. |
| WB | Write Byte. WB writes the C Bus 26 data from the process field operation to the memory address indicated by the address selection field. Data is taken from the least significant byte of the C Bus; all other C Bus data is ignored. Alignment logic 74 places the byte of data into the appropriate byte location within the data bus based on EA[30:31] according to the following criteria.<br>EA[30:31] signal pins:  C[24:31] will be output on data lines:<br>0 0  D[0:7]<br>0 1  D[8:15]<br>1 0  D[16:23]<br>1 1  D[24:31]. |
| WBND | Write byte With No Data. WBND is similar by Write Byte except that CPU 10 supplies no data (CPU 10's data bus is tristated). In accordance with an aspect of the invention the translation opcode WBND may be used for operations in which CPU 10 generates a desired memory address and the coprocessor 3 supplies the data byte to be written. |
| RW | Read Word. RW reads the data from the full-word address found at the source indicated by the address selection field. The two least significant bits of addressing information are ignored. The data is read into the MDR 60. |
| WW | Write Word. WW writes the C Bus 26 data from the process field operation to the memory address indicated by the address selection field. The least significant two bits of addressing information are ignored. |
| WWND | Write Word With No Data. WWND is substantially identical to Write Word, except that no data is driven onto the system data lines. In accordance with an aspect of the invention, WWND may be used for |

TABLE 6-continued
TRANSLATION OPCODES

| Opcode | Description |
|---|---|
| | operations in which CPU 10 generates a desired memory address and the external coprocessor 3 supplies the data word to be written. |
| RH | Read Half-Word. RH accesses a full-word of data from the address indicated by the address selection field. The least significant bit of addressing information is ignored. The half-word indicated by bit 30 of the address is gated to the least significant half-word of the MDR 60, and the most significant half-word of the MDR is set to zero. |
| RHE | Read Half-Word with Sign Extension. RHE accesses a full-word of data from the address indicated by the address selection field. The least significant bit of addressing information is ignored. The half-word indicated by bit 30 of the address is gated to the least significant half-word of the MDR 60. The most significant half-word of MDR 60 is set to zero if the updated MDR[16] equals zero or is set to ones if the updated MDR[16] equals one. |

There are five memory field opcodes that control the internal MMU 18. These are WIPE, DATE, WITE, DIE, and LRNG. The MMU 18 will be described in detail in Section C below. Table 7 describes these five MMU 18 related opcodes.

TABLE 7
Memory Field Opcodes

| Opcode | Description |
|---|---|
| WIPE | Write Internal Permanent Entry. WIPE updates the permanent entry (one to four) indicated by the two least significant bits of the EA Bus 28. Normal preparation for the execution of this instruction is to:<br>1. Load C[0:29] with the page frame data<br>2. Mask off the two least significant bits of the virtual address and store it in a selected MAR.<br>3. Logically OR a 0, 1, 2, or 3 into the selected MAR to address a given permanent entry.<br>If the virtual address information matches that of any entry, the MMISS status bit (SR28) is set to zero and no write occurs. In all other situations, the MMISS status bit is set to one. |
| DATE | Delete All Temporary Entries. DATE deletes (invalidates) all 16 MMU 18 temporary entries at once. |
| WITE | Write Individual Temporary Entry. WITE updates a temporary, least recently used, internal MMU entry. The virtual address is placed on the EA Bus 28 (via a MAR, for example) and the page frame entry, which is loaded from the previous C[0:29], is the write data. The page frame entry is written to C[0:29] during the instruction that immediately precedes the WITE instruction. An attempt to write an entry for which the virtual page number already exists in any entry sets the MMISS status bit (SR28) to zero. In this situation, the write does not take place. Otherwise, the MMISS status bit is set to one. |
| DIE | Delete Individual Entry. DIE utilizes the virtual address on the EA Bus 28 (from a MAR) to specify the internal MMU 18 temporary and/or permanent entry to be deleted from the internal MMU. If no matching entry exists, the MMISS bit (SR28) is set to one, otherwise the |

TABLE 7-continued
Memory Field Opcodes

| Opcode | Description |
|---|---|
| | MMISS bit is set to zero. |
| LRNG | Load Ring Register. LRNG loads the 3-bit value from the previous C[29:31] into the internal Ring Register 66 for internal MMU 18 translation. External ring information is contained generally in external logic 8. A system having external address translation logic typically does not use this opcode since the ring number is loaded into the external logic by an XRF write opcode. Systems using the internal MMU 18 may utilize this opcode in addition to loading the ring number into the external logic. C[29:31] is preferably loaded with the required data during the instruction that immediately precedes the LRNG. |

There are ten nontranslation opcodes, that is, memory field opcodes that issue only physical addresses. These are RTRAM, WTRAM, TRCT, RRCT, RCP, SCP, RIO, WIO, RWX and WWX. Because the TRANSb output pin is driven high when any of these opcodes are issued, all addresses issued from these opcodes are considered to be physical addresses regardless of the state of the PHYS status bit.

Figure 6:
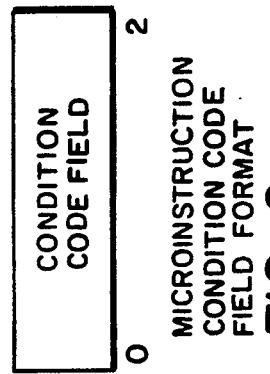
FIG. 6 shows the condition code field of the microinstruction of FIG. 3.

As can be seen in FIG. 6 the condition code (CC) field is a 3-bit field that specifies either a NOP or the condition code operation type. The condition code format is shown below in Table 8.

CC[0:2] specify the condition code operation type; the actual two bit condition code is held in the Program Mask Register (PMR) 62. The five condition code operation types are: arithmetic (CCA), logical (CCL), unnamed (CCR), status (CCS), and external (CCX).

Condition code settings are based on live status conditions (status generated from the current cycle) and/or the status bits (live status conditions that are latched from the previous cycle) or, in the case of CCX, the status of the external condition code pins XCC0 and XCC1.

TABLE 8

| CC[0:2] | CC Type | PMR 62 | Definition |
|---|---|---|---|
| 0 | NOP | Previous CC | No Operation |
| 1 | CCA | 0 0 | LOVF = 0 and LALU = 0 |
| 1 | CCA | 0 1 | LOVF = 0 and LSGN = 1 and LALU = 1 |
| 1 | CCA | 0 1 | LOVF = 1 and LSGN = 0 |
| 1 | CCA | 1 0 | LOVF = 0 and LSGN = 0 and LALU = 1 |
| 1 | CCA | 1 0 | LOVF = 1 and LSGN = 1 |
| 2 | CCL | 0 0 | LALU = 0 |
| 2 | CCL | 0 1 | LALU = 1 and LCA = 0 |
| 2 | CCL | 1 0 | LALU = 1 and LCA = 1 |
| 3 | CCR | 0 0 | LALU = 0 and LCA = 0 |
| 3 | CCR | 0 1 | LALU = 1 and LCA = 0 |
| 3 | CCR | 1 0 | LALU = 0 and LCA = 1 |
| 3 | CCR | 1 1 | LALU = 1 and LCA = 1 |
| 4 | CCS | 0 0 | SP8 = 0 and SP9 = 0 |
| 4 | CCS | 0 1 | SP8 = 0 and SP9 = 1 |
| 4 | CCS | 1 0 | SP8 = 1 and SP9 = 0 |
| 4 | CCS | 1 1 | SP8 = 1 and SP9 = 1 |
| 7 | CCX | 0 0 | XCC0 = 0 and XCC1 = 0 |
| 7 | CCX | 0 1 | XCC0 = 0 and XCC1 = 1 |
| 7 | CCX | 1 0 | XCC0 = 1 and XCC1 = 0 |
| 7 | CCX | 1 1 | XCC0 = 1 and XCC1 = 1 |

All condition code functions except CCS reflect the results of the current operation only. The SS branch field microinstruction (described in Table 11a) or a previous process field operation has no effect on the current condition code operation, unless it is CCS. CCS is only updated from the results of the previous operation. If the PMR 62 is specified as the C Bus operand in the process field operation and a condition code operation is specified, the condition code operation will supersede the process field operation.

In accordance with one aspect of the invention the condition code type CCX enables the setting of the condition codes in PMR [0:1] from the input signal pins XCC0 and XCC1. This mode of operation is especially advantageous when the CPU 10 is operating in conjunction with the coprocessor 3 in that it permits a tightly coupled interface to be formed between the CPU 10 and the coprocessor. For example, the coprocessor 3, by controlling the state of XCC0 and XCC1, may directly affect the execution of a CPU 10 microinstruction, such as the Branch with Condition Code Check (BCC) which will be described in Table 9.

Figure 7:
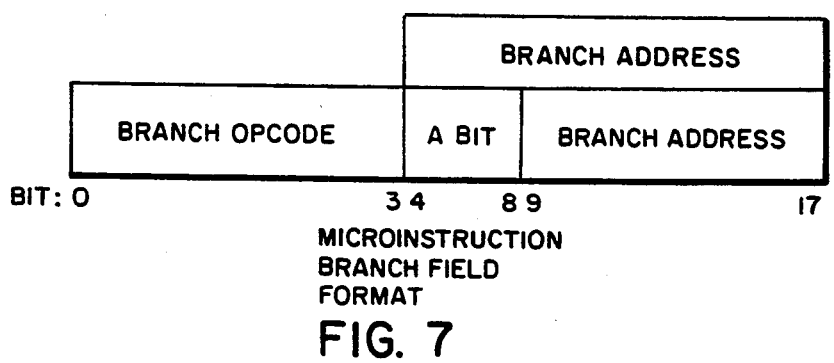
FIG. 7 shows in more detail the format of the branch field of the microinstruction of FIG. 3.

As shown in FIG. 7 the branch field is an 18-bit field that controls the modification of the microinstruction counter (IC) and status bits. One of the additional functions of the branch field is to perform the Branch to Next Macroinstruction (BNM) operations.

The branch field consists of two subfields: the Branch Opcode subfield (Branch[0:3]) and the Branch Address subfield (Branch[4:17]). For some operations which will be described below the branch address subfield is differentiated into an A bit subfield (Branch [4:8]) and a Branch Address subfield (Branch [9:17]).

The five types of branch field operations are: branch operations, branch to next macroinstruction (BNM) operations, multi-way operations, subroutine operations, and status setting operations.

The branch operations, namely BU, BCC, BF, and BT are described in Table 9.

TABLE 9

| Operation | Description |
|---|---|
| BU | Unconditional Branch. BU branches to the microinstruction address in Branch[4:17]. |
| BCC | Branch With Condition Code Check. BCC examines the condition code mask, which is held in IREG 52 [0:3], and the condition code, (CC) which is held in PMR 62 [0:1]. The condition code selects one of the IREG 52 bits. For example, a CC of 0 selects IREG[0]; a CC of 1 selects IREG[1]; etc. If the selected IREG bit equals 0, then a branch to the microinstruction address in Branch[4:17] is executed. Otherwise, the next microinstruction (IC+1) follows. The operation of BCC inserts Wait/BDX state whether or not a BD or BDX is specified in the memory field. |
| BF | Branch False. BF tests the status bit specified by the A Bit subfield, Branch [4:8]. If the value of the selected status bit is 0, then the branch is taken. The branch address is formed by concatenating IC+1[0:4] (the five most significant bits of the incremented IC) with Branch[9:17]. Conditional branches are limited to a range of 512 microinstruction locations. |
| BT | Branch True. BT tests the status bit specified by the A Bit subfield. If the value of the selected status bit is 1, the branch is taken. The branch address is formed by concatenating IC+1[0:4] (the five most significant bits of the incremented IC) with Branch[9:17]. |

TABLE 9-continued

| Operation | Description |
|---|---|
| | branch is taken. The branch address is formed by concatenating IC+1[0:4] (the five most significant bits of the incremented IC) with Branch[9:17]. |

Branch to Next Macroinstruction (BNM) prepares CPU 10 to process the next macroinstruction and enables the processing of some exceptions, as will be described. BNM operations check for BNM-time traps, form a 14-bit multi-way branch address using the ISET status bit (SR 29) and the current half-word (CH 42), set up IREG 76, and load IAD 48 from MAR0 54.

Figure 8:
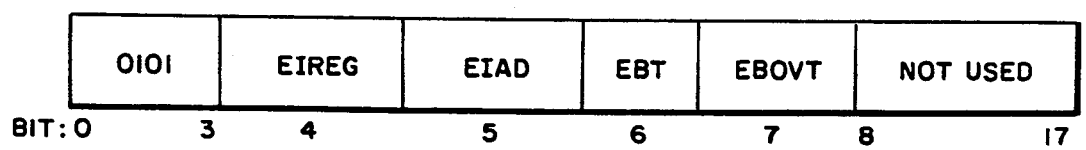
FIG. 8 shows the format of the branch field for a branch to next macroinstruction (BNM) branch field opcode.

The BNM algorithm is described in Table 10 for BNM operation. Some BNM commonly used operations (BNM, BNMX, BNMV, and BNMI) are implemented as pseudo-opcodes. The BNM opcode format is shown in FIG. 8. The bits shown therein are defined as follows.

EIRG is the Enable IREG Updating field. A one in EIREG enables IREG updating; a zero in EIREG inhibits IREG updating.

EIAD is the Enable IAD updating field. A one in EIAD enables IAD updating; a zero in EIAD inhibits IAD updating.

EBT is the Enable BNM-Time Traps Field. A one in EBT enables all BNM-time traps except Branch if Prefetch Buffer Empty (BPBE); a zero in EBT inhibits all BNM-time traps except BPBE. EBOVT is the enable Branch if Overflow Trap (BOVT) field. A one in EBOVT enables the BOVT trap; a zero in EBOVT inhibits the BOVT trap.

TABLE 10

| BNM ALGORITHM | | |
|---|---|---|
| Step | Action | |
| 1 | RIPPLE MAR0 +2 | |
| 2 | LOAD IAD 48 -- Load IAD 48 from the value contained in MAR0 54 before the BNM. This operation loads IAD 48 to point to the start of the upcoming macroinstruction. The IAD 48 is not loaded if the BNM operation has EIAD = 0, or the LOVF status bit = 1 and EBOVT = 1, or a trap is pending. | |
| 3 | Process the current half-word. | |
| 3a | Create the 14-bit multi-way branch address. | |
| 3b | If the indirect register (IREG) 76 = 1, move CH[12:15] to the index register (XREG) 78 and move CH[8:15] to IREG 76. | |
| 4 | TRANSFER CONTROL -- If any of the BNM-time traps are active, vector to the BNM-time trap handler. The BNM-time traps are listed in Table 11. Otherwise, transfer control to the microinstruction address generated in Step 3a. | |

TABLE 11

| Trap | Description | Source Internal/External |
|---|---|---|
| BOVT | Overflow Trap | Internal |
| BEX | EXECUTE Instruction | Internal |
| BPWF | Power Failure | External |
| BET | Event Timer | External |
| BTIC | Clock Interrupt | External |
| BIO | I/O Interrupt | External |
| BCM | Control Mode | External |
| BCOT | Coprocessor | External |
| BPBE | Prefetch Buffer Empty | Internal |
| BDG | Software Debug | Internal |

CPU 10 also includes a Status Setting (SS) operation which provides the microcode with the ability to affect status bits, including the aforedescribed spare bits (SR0-SR9). The A Bit and B Bit fields each select one of the 32 CPU 10 status bits. The selected status bits are operated on in accordance with the status opcode, and the resultant bit value is stored in the B Bit field. If a status bit is also affected by a process or memory field operation, the SS operation will be superseded. Barring any trap conditions, the next instruction counter (IC) address is IC+1.

Figure 9:
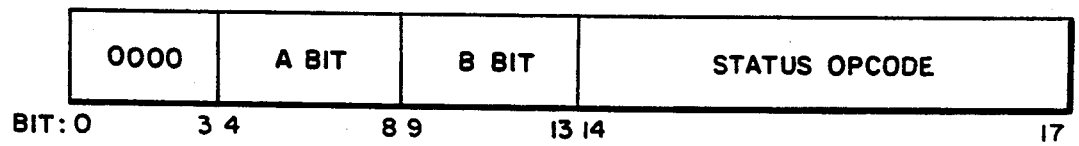
FIG. 9 shows in more detail the format of the branch field for a microinstruction which includes a status setting (SS) branch field opcode.

The format of the SS opcode is shown in FIG. 9 and is described in Table 12.

TABLE 12

| MNEMONIC | OPERATION |
|---|---|
| RESET | 0 |
| NOR | A NOR B |
| ANDNOT | A AND B |
| NOT | B |
| IAND | A AND B |
| IVN | A |
| XOR | A XOR B |
| NAND | A NAND B |
| AND | A XNOR B |
| XNOR | A AND B |
| MOVE | A |
| ORNOT | A OR B |
|  | B |
| IOR | A OR B |
| OR | A OR B |
| SET | 1 |

As can be appreciated, the SS opcode provides for the value of any one of the status register bits, for example the spare bit SR 1, to be logically modified by the state of another status register bit, for example MMISS (SR 28) and the result placed in SR 1. Subsequent branch operations, such as Branch False (BF) or Branch True (BT) may thereby transfer control to other microinstruction locations. Such status register bit modification and conditional branching results in the formulation of highly efficient and powerful macroinstructions.

Referring to FIG. 2c there is shown in block diagram form a CPU 10 Branch Unit 120. Branch Unit 120 comprises a Control Address Latch 122 which has 14 outputs which define the CMA to Control Memory 14. Control Address Latch 122 receives input from a plurality of sources depending upon the type of branch operation or the type of addresses currently being employed. The microinstruction Branch field (FIG. 3) is provided to Control Data One (CD1) Latch 124. An output of CD1 Latch 124 is coupled to the input of Control Address Latch 122, which also has output for providing the Control Address to a Control Address Incrementer (CAI) 126. CAI 126 provides an incremented Control Address to a Control Subroutine Stack (CSS) 128 when it is necessary to nest microinstruction addresses due to the occurrence of transfer of control instructions. Control Address Latch 122 also receives an input from a Next Macro Driver 130 which has as its input ISET (SR 28) and the MSB of the CH Register 42. Next Macro Driver in general provides the initial address of a microinstruction or microinstructions which correspond to a macroinstruction. Multiway Driver 132 receives an input from BMWR 38 and is employed for multiway branch operations. Trap Vector Driver 134 receives an input which corresponds to a decode of all CPU 10 trap conditions and which therefor provides a microinstruction trap vector address for accessing trap related microinstructions.

C. ADDRESS TRANSLATION

Many data processing systems employing a data processor are required to perform address translations for certain memory field operations that access main memory. In these circumstances, the effective address must be translated from a virtual address to a physical address before it can be used by main memory. CPU 10 can, in general, perform address translations in one of two ways: the CPU 10 may utilize either the internal memory management unit (MMU) 18 or external address translation hardware such as a memory Translation RAM (TRAM).

The internal MMU 18 may be used to perform address translation for memory field operations that access main memory (opcodes 0xxxx). These operations include memory read, memory write, and IFetch operations. If the MMU 18 performs an address translation, the effective address is translated before it is driven off-chip. The operation of the internal MMU 18 is described below.

CPU 10 also supports the use of external hardware for address translation. If external hardware is to perform an address translation, the untranslated effective address is driven-off chip and is translated externally. The external address translation hardware may be constructed in a number of fashions and may include a table look up type of translation means, such as a table stored in RAM. Certain microinstructions, such as RTRAM and WTRAM, and output signals, such as TRANSb, support the operation of external address translation hardware.

The MMU status bit (SR27) specifies whether or not the MMU 18 is to perform address translations. If the MMU status bit equals a one, the MMU performs address translations for certain memory field operations under conditions which will be specified below. If the MMU status bit equals a zero, MMU 18 performs no address translation and address translation, if any, is performed by external hardware.

In general, the address formats of the internal MMU 18 may be used to define and control the translation of an effective memory address from a virtual address to a physical address for certain memory field operations. The formats of the virtual and physical addresses when the MMU 18 is used for address translation are shown in FIGS. 10a and 10b, respectively.

Figure 10A:
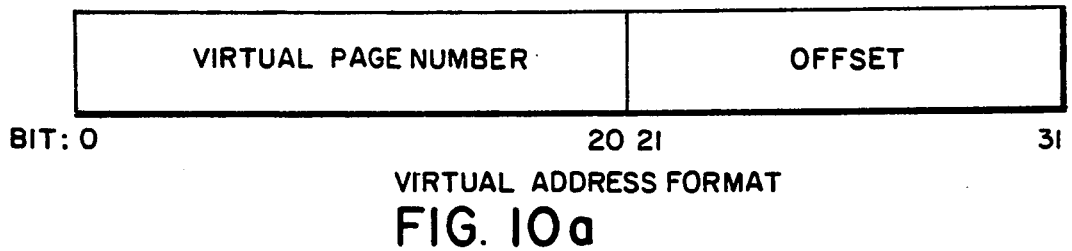
FIGS. 10a and 10b show the format of a virtual address and a physical address, respectively, which is employed by the MMU 18 of FIG. 2.
Figure 10B:
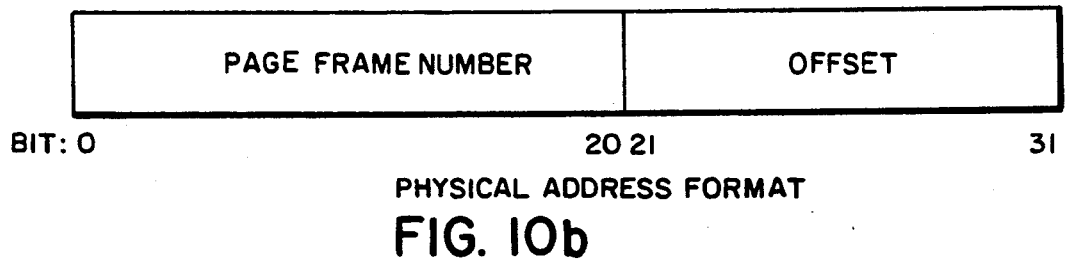

In general, the MMU 18 translates the effective address by replacing a 21-bit virtual page number of FIG. 10a with a 21-bit page frame number of FIG. 10b. The address offset into the page remains unchanged by the translation.

The information required by the MMU 18 to perform address translations is stored in the form of Address Translation Entries (ATEs) in ATE Register 34. Each ATE contains the virtual page number, page frame number, ring number, and write protection bit of a virtual page of main memory.

Both the virtual page number and the page frame number are 21-bit unsigned integers. The ring number is a 3-bit unsigned integer that specifies the lowest process level that is allowed to access the page for a read or a write in the user state (STATE status bit (SR 23) equals 1). The write protection bit is a single bit that indicates whether or not the page is write-protected. If the write protection bit equals 1, then the page is write-protected; otherwise, the page is not write-protected.

The MMU 18 in the preferred embodiment of the invention stores up to 20 ATEs. In accordance with one aspect of the invention, four of the ATEs are considered permanent and sixteen are considered temporary. The storage of ATEs in the MMU 18 is controlled by microcode using the aforedescribed memory field operations WIPE, WITE, DIE, and DATE. For example, the permanent ATE entries may advantageously be employed to store translation data relating to the operations system (OS), thereby enabling the OS to execute more efficiently since it will not be frequently "swapped out" to make room in memory. The sixteen temporary ATE entries are managed by a "least recently used" (LRU) memory management technique to eliminate, when necessary, an entry or entries which have been loaded the longest and which have been least recently used for an address translation. This LRU algorithm is implemented by a stack mechanism whereby an ATE entry that is utilized for a translation is removed from the stack and reinserted at the top of the stack, the stack being pushed down to make room for the entry moved to the top. It can be appreciated that this technique ensures that the entries at the bottom of the stack have least recently been accessed.

For each microinstruction, the MMU 18 assumes that the effective address is a virtual address and compares the virtual page number of the effective address to the virtual page number of each ATE stored in the MMU 18. If the virtual page number of the effective address does not equal the virtual page number of any ATE stored in the MMU 18, then an MMU miss condition is said to exist for the microinstruction; otherwise, an MMU miss condition does not exist. Thus, an MMU miss condition indicates that no ATE is available in the MMU 18 to translate the effective address. In this case, the page frame information (physical address[0:20]) which is driven off-chip is set to zeroes.

For each microinstruction, the MMU 18 modifies the MMISS status bit (SR28) to indicate whether or not an MMU miss condition exists for that instruction. The MMISS status bit is set to one if a miss condition exists; otherwise, the status bit is set to zero. This condition occurs for every microinstruction regardless of whether or not the MMU performs an address translation.

On each microinstruction, the MMU 18 translates the effective address if, and only if, each of the following conditions exists: the MMU status bit (SR 27) equals 1 (prior to instruction execution); both the VMPC (SR 25) and PHYS (SR 26) status bits equal 0 (prior to instruction execution); and the memory field operation is a main memory access operation (opcodes 0xxxx).

As has been previously stated, when equal to 1 the VMPC and PHYS status bits indicate that the effective address is already a physical address and thus suppress translation of the address by the MMU 18.

On each microinstruction for which the MMU 18 performs an address translation the translation is successful if an MMU miss condition does not exist. In this case, the physical address is evaluated from the ATE that has the same virtual page number as the effective address. The physical address is evaluated using the format described above in relation to FIG. 10.

For each microinstruction for which the MMU 18 performs an address translation, the translation is unsuccessful if an MMU miss condition exists. In this case, the effective address is translated into a physical address consisting of all zeros, and this physical address is driven off-chip. For each of these microinstruction for which the MMU 18 performs an unsuccessful address translation either a MISS trap or an IFLT condition is signaled. An IFLT condition is signaled if the memory field operation is an IFetch operation; otherwise a MISS trap is signaled. Output signals data strobe (DS) and data bus enable (DBEN) are inhibited when an MMU miss condition is detected.

On each microinstruction for which the MMU 18 performs a successful address translation a protection violation occurs if either one of two conditions is found to exist. One, if during a read operation, the STATE status bit equals one (prior to instruction execution) and the read ring number of the ATE is greater than the ring number stored in the internal ring register 66, or, two, if during a write operation the STATE status bit equals one (prior to instruction execution) and the write ring number of the ATE is greater than the ring number stored in the internal ring register 66. As has been previously described, the STATE status bit (SR 23) indicates whether the current process is in the user or the system state. The process is in the user state if the STATE bit equals a one, and in the system state if the STATE bit equals a zero. The internal ring register 66 contains the ring number of the current process. Its value is set by microcode using the LRNG memory field operation as has been previously described.

If, on a given microinstruction, the MMU 18 performs a successful address translation while the STATE status bit equals a one and a protection violation occurs, then either a RPVM trap, WPVM trap, or IFLT condition is signaled. An IFLT condition is signaled if the memory field operation is an IFetch operation; a WPVM trap is signaled if the memory field operation is a memory-write operation (opcodes 0xxxx1). Otherwise, a RPVM trap is signaled. In all of these cases, the output signal DS is not generated. If the STATE status bit equals zero, no protection violation trap occurs.

The ATEs are stored in the twenty registers collectively designated the ATE registers 34. Each ATE stored in the MMU 18 is stored in a separate ATE register. At power-on reset (POR), each ATE register is initialized to be empty. After POR, ATEs are stored in the ATE registers only by the execution of the WIPE or WITE memory field operations, as specified above. ATEs can be deleted from the MMU 18 by using the DIE or DATE memory field operations, also as specified above.

FIG. 2d shows the MMU 18 in greater detail wherein it can be seen that the ATE registers 34 are comprised of a set of Page Frame Entry Registers 100 and a set of Virtual Page Number Registers 102. Register Set Control Logic 104 manages the operation of the aforedescribed least recently used ATE storage algorithm, manages the control of the MMISS status register bit (SR 28) and the other functions described which are related to the operation of the MMU 18. The EA bus 28 is coupled to an Effective Address Latch 106 which provides latched effective addresses for storage in a Virtual Page Number Register 102. Data Latch 108 is also coupled to EA bus 28 and supplies latched data for storage in Page Frame Entry Register 100 and Ring Register 66. An output Address Latch 110 receives addresses from three possible sources and drives the System Address Bus.

As has been stated, in accordance with one aspect of the invention there are two types of ATE registers: permanent and temporary. There are four permanent ATE registers and sixteen temporary ATE registers.

The difference between the permanent and temporary registers is the manner that the WIPE and WITE instructions store ATEs in the registers. As far as address translation and the determination of the MMU miss condition are concerned, there is no significant difference between those ATEs stored in the permanent and temporary ATE registers.

Figure 11A:
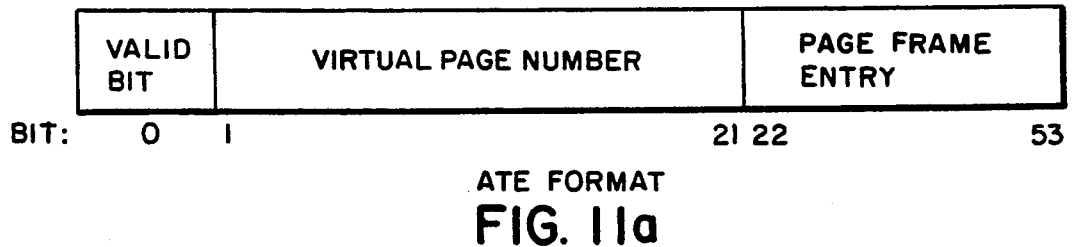
FIG. 11a shows the format of a typical address translation entry (ATE) which is a feature of the MMU 18 of FIG. 2.
Figure 11B:
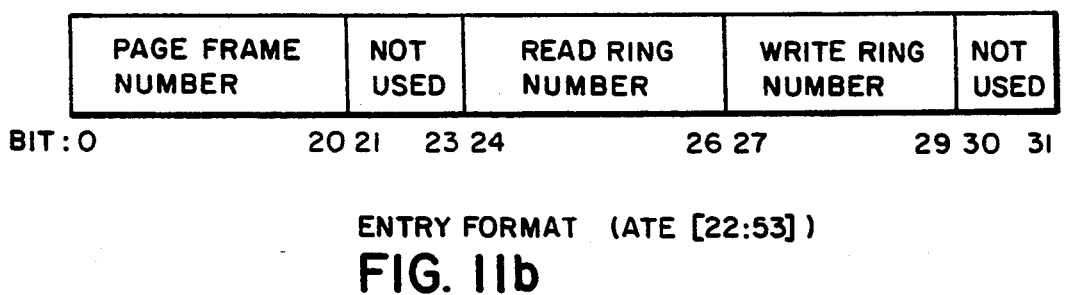

The WIPE and WITE memory fields operate to store ATEs in the MMU 18. For either operation, the virtual page number of the ATE is determined by the effective address according to the virtual address form as given above in relation to FIG. 10. The page frame number, ring number, and write-protect bit of the ATE are determined by the data from the previous C BUS 26[0:29]. This data is called the page frame entry. The formats of an ATE and a page frame entry for the WIPE and WITE operations are shown in FIGS. 11a and 11b, respectively.

The WIPE operation stores the ATE in a permanent ATE register. The permanent ATE registers are numbered from 0 to 3. The register in which the ATE is stored is specified by the two least significant bits of the effective address; LEA [30:31] which are input to Register Set Control Logic 104.

The WITE operation stores the ATE in the least recently used temporary register. A temporary register is considered to be used when either an ATE is stored in it using the WITE operation, or the register is full and the ATE stored in it is used for address translation.

The MMU 18 does not perform a WIPE or WITE operation if it could result in two ATEs being stored with the same virtual page number. Specifically, an ATE is stored by either a WIPE or a WITE microinstruction only if an MMU miss condition (SR 28=1) exists for the microinstruction. If a WIPE or WITE memory field microinstruction stores an ATE in an ATE register that was full before the operation is performed, the ATE previously stored in the register is effectively deleted from the MMU 18. Issuing a DIE instruction, described below, for the page to be written before a WIPE instruction ensures that the entry is loaded within an ATE register.

The DIE and DATA memory field operations are utilized to delete ATEs from the MMU 18. The DIE operation deletes any ATE that has the same virtual page number as the effective address using the virtual address format given above. If an MMU miss condition exists for the microinstruction, then no ATE is deleted. If an MMU miss condition does not exist, then the ATE is deleted, and the ATE register that contained the deleted ATE becomes empty. The DATE operation deletes all ATEs stored in temporary ATE registers, thereby causing all temporary ATE registers to become empty.

To check the contents of the MMU, all $2^{20}$ possible entries may be tested using the TIE pseudo-opcode (NOP). The TIE memory field pseudo-operation tests for the existence of an ATE with a specified virtual page number. The virtual page number is specified by the effective address according to the virtual address format given above. This pseudo-operation is implemented as a memory field NOP operation, and the existence of the ATE can be determined by examining the MMISS status bit (SR 28) after the operation.

As has been stated, the ring register 66 is used to store the ring number of the current process. The ring number is a 3-bit unsigned integer that indicates the process level of the current process, and is used to determine the occurrence of protection violations. The value of the internal ring register can be written only by the LRNG memory field operation. The LRNG memory field operation stores the previous C[29:31] in the internal ring register.

The aforementioned external address translation logic may determine whether or not a given memory field requires address translation by examining the memory field operation at the control data pins. In an external translation system, if the TRANSb pin equals zero, then translation is required. If the TRANSb pin equals one, no translation is required.

D. PROCESSING STATES AND TIMING

In a preferred embodiment of the invention a basic microinstruction cycle is 210 nanoseconds in duration. As can be seen in FIG. 12 each 210-nsec cycle 150 consists of two 105-nsec timing (T) states (152a, 152b). Each 105-nsec T state consists of three 35-nsec Phi states (154a, 154b, 154c). The first of these T states is the Fetch state 156 and the second is the Store state 158. The basic timing is derived from a CLOCK input to CPU 10.

The process and branch field operations span from the start of a Fetch state to the end of the ensuing Store state. This time span defines a microcycle. Memory field operations start at the beginning of a Fetch state, and the memory cycle ends at the completion of the next Fetch state, provided no Wait or Bus Grant states are encountered.

CPU 10 has nine timing states: Init 160, Fetch 156, Store 158, Wait/BDX 162, Bus Grant 164, Pre Bus Grant 166, Arith 168, Trap1 170, and Trap2 172. Table 13 describes each of these states, which are also illustrated in FIGS. 12b–12d.

TABLE 13

| State | Description |
|---|---|
| Init | The Init state is the starting point of execution for CPU 10. In this state, all hardware initializations take place. Init is entered on the occurrence of a high-to-low transition of the RESETb input. During the Init state, the clock is ignored. When the RESETb input is deactivated, the TRAP1 state is entered. |
| Fetch | The Fetch and Store states normally define the microcycle, of which Fetch is considered to be the start. The process, memory, and branch field operations start in the Fetch state. The memory field operation usually finishes in the Fetch state. The Fetch state is normally entered from and followed by the Store state. |
| Store | The Store state is the normal completion of a microcycle. The process and branch field operations finish in this state. The Store state is normally entered from and followed by the Fetch state. |
| Wait/BDX | Wait states are inserted after the Store state to delay the completion of a memory or other external cycle. Wait states are generated as long as the WAITb input signal pin is active. The BD/BDX sum is also generated in this state. During the Wait state, the CMHS signal pin is tristated to allow, if desired, an external device to read the contents of control memory. |
| Bus Grant | The Bus Grant state tristates data signal pins[0:31] and asserts the Bus Grant (BG) output signal pin. Bus Grant states are generated as long as the Bus Request (BRb) input signal pin is active. Bus Grant states always follow the Pre Bus Grant state and are followed |

TABLE 13-continued

| State | Description |
|---|---|
| | by the Fetch state. |
| Pre Bus Grant | The Fetch state normally completes the memory cycle. If, after the completion of a microcycle (after the Store state), a bus grant is to be issued, the memory cycle must still be completed. A Pre Bus Grant state is inserted between the Store and Bus Grant states or between the Wait/BDX and Bus Grant states in order to complete a current memory cycle. |
| Arith | The Arith state performs the shifts and adds for multiplication. It is selectively repeated, followed by the store state. The Arith state follows the Fetch state. The Arith state also performs the shifts and addition/subtraction for the restoring division algorithm. It is selectively repeated and is followed by the Store state. Also, the Arith state may be inserted to provide an extra state that provides the additional time needed to perform BCD operations. |
| Trap1 | The Trap1 state is the first state entered for processing a trap. During the Trap1 state, the TRAP signal is cleared, either the trap vector address or the PECM vector address (depending on which signal is active) is loaded into the instruction counter, and a control memory read cycle is started (as in Fetch). If both signals are active, the PECM address takes precedence. Trap1 reenables EAR 32 updating and DS output signal generation. Future traps are inhibited until a BMW, with the inhibit INH bit equal to 0, is issued. The TRAP1 state always follows the Fetch state and is always followed by the Trap2 state. |
| Trap2 | The Trap2 state is similar to a Store state. The control memory 14 is accessed and microinstruction decoding is started. The Trap2 state always follows the Trap1 state and is always followed by the Fetch state. |

In accordance with another aspect of the invention CPU 10 is operable for providing on the system address bus, at a time when the bus is not required to convey address information to the system memory 2, the result of a previous AEU 12 logical, arithmetic or shift operation. This capability facilitates diagnostic operations wherein the AEU 12 may be directly monitored by observing the system address bus during the appropriate portion of a cycle. This AEU 12 result data is provided during the Phi 2 state of the store portion of a cycle, the main memory address having been previously provided sometime during the preceding fetch portion of the cycle. Inasmuch as the address strobe (AS) signal is typically utilized to latch the address bus, the address bus may thereafter be utilized to convey the AEU 12 result information. The AEU 12 result is coupled to the EA bus 28 and is driven onto the system address bus. The Trap Strobe output signal line (Table 14) is asserted during the Phi 2 portion of Store in order to latch, if desired, this AEU 12 result information within external hardware.

E. EXTERNAL INTERFACE

The CPU 10 external interface signal pins are shown in Table 14.

TABLE 14

CPU 10 Signal Descriptions

| Pin Quantity | Signal | Input/Output | Description |
|---|---|---|---|
| 8 | $V_{DD}$ | I | Power |
| 10 | $V_{SS}$ | I | Ground |
| 1 | CLK | I | CLK is the input from a crystal oscillator having six times the microcycle frequency of CPU 10. |
| 1 | CLCKOUT | O | CLKOUT is asserted during Phi 3 of each state. |
| 1 | WAITb | I | A low on WAITb at the end of the Fetch state causes MCU 10 to enter a succession of Wait states, from which it does not exit until the Waitb input is driven high. |
| 1 | RESETb | I | A low on RESETb puts CPU 10 into an INIT state. While the RESETb input is active, all trap and BNM-time trap signals except INIT are set to 0. The INIT trap is set to 1 until it is recognized. Also during the Init state, all status bits are set to 0. |
| 1 | BRb | I | A low on BRb indicates that a bus request from another device has been received. When ready, CPU 10 enters the Bus Grant State. |
| 1 | BG | O | A high on BG indicates that CPU 10 has entered the BUS Grant state and has tristated the appropriate outputs. |
| 1 | TSb | O | Trap Strobe is used by external logic to strobe certain externally generated trap signals. Trap Strobe is also used, as described above, by external logic to latch the AEU 12 result data appearing on the system address bus. |
| 2 | XCC0 | I | XCC1 and XCC2 receive a condition code setting from an external source, e.g., a coprocessor. |
| 1 | TRANSb | O | In a TRAM system, TRANSb indicates whether or not translation is needed. A 0 on TRANSb indicates that translation is required. A 1 on TRANSb indicates that translation is not required. For a system using MMU 18, TRANSb = 0 indicates the occurrence of an MMU 18 miss condition when translation was required. The logical state of TRANSb is a function of status bits MMU (SR 27), PHYS (SR 26) VMPC (SR 25) and MMISS (SR 28) in conjunction with memory field opcode bit zero. |
| 1 | XTRAP | I | A high on XTRAP during the Fetch state causes CPU 10 to enter a series of Trap states. |
| 1 | DTRAP | I | DTRAP indicates a data error caused by a CPU 10 memory transaction. A high on DTRAP during the Fetch state causes CPU 10 to enter a series of Trap states. |
| 1 | XBTRAP | I | A high on XBTRAP during the end of the Store state immediately preceding a BNM causes the instruction counter to be loaded with the BNM-time trap vector. |
| 1 | XIFLT | I | A high on XIFLT indicates |

TABLE 14-continued
CPU 10 Signal Descriptions

| Pin Quantity | Signal | Input/ Output | Description |
|---|---|---|---|
| | | | that a trap condition existed during an IFetch. |
| 1 | RW | O | RW indicates the direction of flow of DSb. |
| 32 | ADDR[0:31] | O | The address output lines (ADDR[0:31]) comprise the main addressing interface to the remainder of the system. ADDR[0:31] also conveys the result of a previous AEU 12 operation during the Phi 2 portion of the store portion of a cycle. |
| 1 | AS | O | Address strobe is used to latch the address off-chip for data memory, I/O, XRF, etc. operations |
| 32 | DATA[0:31] | I/O | The bidirectional data lines (DATA[0:31]) comprise the main data interface to the rest of the system. |
| 1 | DSb | O | Data Strobe is used to clock the data off-chip for data memory, I/O, XRF, etc. DSb is inhibited by IFLT and by internal traps. |
| 1 | DBENb | O | DBENb is provided so that external logic can turn external data bus transceivers around. DBENb is inhibited by IFLT and by internal traps. |
| 14 | CMA[0:13] | O | CMA[0:13] are control memory 14 address lines. During a Wait state or Reset, CMA[0:13] are tristated to allow an external device to read the control memory. |
| 28 | CMD[0:27] | I | CMD[0:27] are control memory data 14 data input lines. |
| 1 | CMHS | O | CMHS indicates odd/even control memory accesses. During a Wait state or Reset, CMHS is tristated to allow an external device to read the control memory. |
| 1 | CMPEb | O | A low on CMPEb indicates a parity error in the control memory 14. |

As has been stated, the control memory 14 is arranged as 28-bit words (CMD[0:27]). Two accesses per microcycle result in the accessing of 56 bits of information. The logical state of signal pin CMHS indicates which 28-bit portion of the control memory 14 (CD1 or CD2) is being accessed. The first access (CD1), during which CMHS is low, obtains the selected microinstruction memory and branch fields. The second access (CD2), during which CMHS is high, obtains the microinstruction process and condition code fields. CMA[0:13] defines a 14-bit address into the control memory 14. Such a two stage access results in a pipelining of the microcode. Also, that segment of microcode (CD 1) which is read in first is in general comprised of microcode data which may require more machine time to decode and operate upon. Thus, for a given cycle, the memory and branch fields are resident within CPU 10 for a longer period of time than the process and condition code fields.

It can be appreciated that the provision of the CPU 10 microinstruction memory in the external control memory 14 provides a number of significant advantages.

One advantage is that upgrades and changes to the microinstructions may be accomplished in a relatively simple manner. For example, if the control memory 14 is comprised of ROM or a PROM type of device installed systems may be easily upgraded by merely replacing the control memory 14 without requiring that the, typically, more costly CPU 10 be replaced. Preferably, control memory 14 is comprised of a RAM which may be loaded each time the system is powered on, thereby providing for changes to be made to the microcode by merely loading new microcode from, for example, a floppy disk via external logic 9. Also, as previously stated, the external microinstruction memory may be accessed during a time when the CPU 10 is in a wait state.

Another advantage of the externally provided control memory 14 accrues to these systems which employ external circuitry, such as a floating point accelerated or coprocessor, which operates either synchronously or asynchronously with the CPU 10. Inasmuch as a coprocessor is preferably informed of the execution condition of the CPU 10, the coprocessor may directly decode a certain field or fields of the microinstructions as they are fetched for execution. For example, a coprocessor may monitor the CMHS output signal line and, when CMHS is determined to be low, latch the state of the memory field opcode portion of microinstruction. The memory field may thereafter be decoded, in accordance with Table 5, to detect the Receive from Coprocessor (RCT) and the Send to Coprocessor (SCP) opcodes thereby facilitating the cooperation between CPU 10 and the coprocessor. Without such direct microinstruction access, as provided by the external central memory 14, CPU 10 may require at least an additional five output pins to convey the state of the memory field opcode.

To support the sharing by asynchronous devices of CPU 10's system resources, such as memory and one or more asynchronous coprocessor devices, the aforementioned bus request and bus grant signals are included as part of CPU 10's pin definition. The BR input is sampled at the end of the Store state, and a Pre Bus Grant state and then a Bus Grant state are generated if BR is asserted. The Bus Grant state tristates DATA[0:31] and asserts BG.

As has been previously stated, one method of enhancing the performance of CPU 10 is to add external task-oriented hardware. A floating-point accelerator is only one example of such a device. External acceleration hardware may employ an additional shared area of the control memory 14. The additional area of control memory 14, designated 14' in FIG. 1, is also addressed by CMD[0:27] and CMHS. In essence, each address location contains a 56-bit CPU 10 control word and an additional control word for the acceleration hardware. Thus, by selecting CPU 10 instructions that decode to sequences of microinstructions which correspond to alternate sequences of microinstructions for the accelerator, a very tightly coupled CPU/coprocessor interface is established whereby the CPU 10 is not required to wait for the coprocessor to complete the execution of a coprocessor instruction.

For systems using MMU 18, each hardware acceleration unit may interface to CPU 10 via the memory data bus and any or all of the five control lines: an input to CPU 10's wait logic, an input to CPU 10's coprocessor trap logic, an input to CPU 10's BNM-time coprocessor trap logic, and two lines to CPU 10's external condition code pins.

For systems having external address translation hardware, each hardware acceleration unit may interface to CPU 10 via the memory data bus and any or all of the four control lines: an input to CPU 10's wait logic, an input to CPU 10's BNM-time coprocessor trap logic, and two lines to CPU 10's external condition code pins.

A presently preferred embodiment of the invention has herein been described and modifications to this presently preferred embodiment may occur to those having skill in the art. It is thus intended that the invention not be limited to only the embodiment disclosed above but that the invention be limited only as defined by the appended claims.

What is claimed is:

1. A microprocessor integrated circuit comprising:

first memory interface means for reading information from a first memory means and for storing information within the first memory means, the first memory means storing at least data and macroinstructions, the first memory interface means comprising a first address bus and a first data bus, the first address bus being coupled at least to the first memory means for supplying addresses thereto;

macroinstruction decoding means, coupled to the first data bus, for decoding a macroinstruction read from the first memory means into a corresponding microinstruction or microinstructions, said macroinstruction decoding means including, second memory interface means for interfacing to second memory means that is disposed external to the microprocessor integrated circuit, the second memory means storing microinstructions, the second memory interface means comprising means for converting a macroinstruction read from the first memory means into an address within the second memory means of a corresponding microinstruction;

a second address bus for coupling between the converting means and the second memory means for providing an address of a microinstruction to the second memory means; and a second data bus for coupling between the second memory means and the microprocessor integrated circuit for conveying an addressed microinstruction to the microprocessor integrated circuit;

condition code register means comprising a plurality of condition bits, the condition code register means being responsive to a content of a condition code field of a microinstruction for selectively setting the plurality of condition bits in accordance with one of a result of an operation that occurs within the microprocessor integrated circuit and a result of an operation that occurs external to the microprocessor integrated circuit;

at least one input signal terminal; and means having an input coupled to the at least one input signal terminal and being responsive to a logical state of the at least one input signal terminal and also being responsive to a content of the condition code field of a microinstruction for setting a logical state of at least one of the plurality of condition bits to a state that is a function of the logical state of the input signal terminal, whereby said at least one of the plurality of condition bits is selectively set to a logical state that is a function of a result of an operation that occurs within the microprocessor integrated circuit and a function of a result of an operation that occurs external to the microprocessor integrated circuit, as a function of the content of the condition code field of a microinstruction.

2. A microprocessor integrated circuit comprising:

first memory interface means for reading information from a first memory means and for storing information within the first memory means, the first memory means storing at least data and macroinstructions, the first memory interface means comprising a first address bus and a first data bus, the first address bus being coupled at least to the first memory means for supplying addresses thereto; and macroinstruction decoding means, coupled to the first data bus, for decoding a macroinstruction read from the first memory means into a corresponding microinstruction or microinstructions, the macroinstruction decoding means including, second memory interface means for interfacing to second memory means that is disposed external to the microprocessor integrated circuit, the second memory means storing microinstructions, the second memory interface means comprising:

means for converting a macroinstruction read from the first memory means into an address within the second memory means of a corresponding microinstruction;

a second address bus for coupling between the converting means and the second memory means for providing an address of a microinstruction to the second memory means; and a second data bus for coupling between the second memory means and the microprocessor integrated circuit for conveying an addressed microinstruction to the microprocessor integrated circuit;

the microprocessor integrated circuit further comprising:

address generation means for generating addresses for accessing address locations within the first memory means, the address generation means having an output coupled to the first address bus, the address generation means comprising address translation means responsive to a logical state of a bit or bits of at least one of the microinstructions for translating a virtual memory address to a physical memory address; and wherein the address translation means further comprises: address translation entry storage means having a plurality of storage locations each of which stores at least a virtual memory address page number and a corresponding physical memory address page number;

comparing means for comparing a virtual memory address page number, that is generated in response to the microprocessor integrated circuit performing a read or write operation to the first memory means, to stored virtual memory address page numbers for determining if a stored virtual memory address page number equals the generated virtual address memory page number; and means, responsive to the operation of the comparing means determining that one of the stored virtual memory address page numbers equals the generated number, for replacing the generated virtual memory address page number with the corresponding stored physical address page number such that the first address bus transmits the corresponding physical memory address page number to the first memory means.

3. A microprocessor integrated circuit as defined in claim 2 wherein a first plurality of the address translation entry storage locations are responsive to a first logical state of a bit or bits of at least one of the microinstructions for storing a virtual memory address page number and a physical memory address page number at a location least recently used for translating a virtual memory address to a physical memory address.

4. A microprocessor integrated circuit as defined in claim 3 wherein a second plurality of the address translation entry storage locations are responsive to a second logical state of the bit or bits of the at least one of the microinstructions for storing a virtual memory address page number and a physical memory address page number at a location explicitly identified by the logic state of a microinstruction bit or bits.

5. A microprocessor integrated circuit comprising:
first memory interface means for reading information from a first memory means and for storing information within the first memory means, the first memory means storing at least data and macroinstructions, the first memory interface means comprising a first address bus and a first data bus, the first address bus being coupled at least to the first memory means for supplying addresses thereto; and
macroinstruction decoding means, coupled to the first data bus, for decoding a macroinstruction read from the first memory means into a corresponding microinstruction or microinstructions, said macroinstruction decoding means including,
second memory interface means for interfacing to second memory means that is disposed external to the microprocessor integrated circuit, the second memory means storing microinstructions, the second memory interface means comprising:
means for converting a macroinstruction read from the first memory means into an address within the second memory means of a corresponding microinstruction;
a second address bus for coupling between the converting means and the second memory means for providing an address of a microinstruction to the second memory means; and
a second data bus for coupling between the second memory means and the microprocessor integrated circuit for conveying an addressed microinstruction to the microprocessor integrated circuit;
the microprocessor integrated circuit further comprising:
address generation means for generating addresses for accessing address locations within the first memory means, the address generation means having an output coupled to the first address bus, the address generation means comprising address translation means responsive to a logical state of a bit or bits of at least one of the microinstructions for translating a virtual memory address to a physical memory address; and wherein the address translation means is responsive to a logical state of a bit or bits of at least one of the microinstructions for not translating a virtual memory address to a physical address and wherein the address generation means further comprises an output signal line for coupling to logic means disposed external to the microprocessor integrated circuit for indicating whether an address being transmitted by the first address bus is a physical memory address or is a virtual memory address.

6. A microprocessor integrated circuit comprising:
first memory interface means for reading information from a first memory means and for storing information within the first memory means, the first memory means storing at least data and macroinstructions, the first memory interface means comprising a first address bus and a first data bus, the first address bus being coupled at least to the first memory means for supplying addresses thereto; and
macroinstruction decoding means, coupled to the first data bus, for decoding a macroinstruction read from the first memory means into a corresponding microinstruction or microinstructions, said macroinstruction decoding means including,
second memory interface means for interfacing to second memory means that is disposed external to the microprocessor integrated circuit, the second memory means storing microinstructions, the second memory interface means comprising:
means for converting a macroinstruction read from the first memory means into an address within the second memory means of a corresponding microinstruction;
a second address bus for coupling between the converting means and the second memory means for providing an address of a microinstruction to the second memory means; and
a second data bus for coupling between the second memory means and the microprocessor integrated circuit for conveying an addressed microinstruction to the microprocessor integrated circuit, wherein the first address bus comprises a plurality of signal lines the number of which defines a maximum possible memory address value and wherein the microprocessor integrated circuit further comprises address generation means coupled to the first address bus, the address generation means comprising:
means, responsive to a logical state of a bit or bits of at least one of the microinstructions, for generating an address within a range of addresses having a maximum value that is less than the maximum possible memory address value; wherein the first address bus comprises 32 signal lines and wherein the address value generating means generates memory addresses within a range of addresses having a maximum value that requires for expression only 24 of the 32 first address bus signal lines.

7. A microprocessor integrated circuit comprising:
first memory interface means for reading information from a first memory means and for storing information within the first memory means, the first memory means storing at least data and macroinstructions, the first memory interface means comprising a first address bus and a first data bus, the first address bus being coupled at least to the first memory means for supplying addresses thereto;
macroinstruction decoding means, coupled to the first data bus, for decoding a macroinstruction read from the first memory means into a corresponding microinstruction or microinstructions, said macroinstruction decoding means including,
second memory interface means for interfacing to second memory means that is disposed external to the microprocessor integrated circuit, the second memory means storing microinstructions, the second memory interface means comprising:

means for converting a macroinstruction read from the first memory means into an address within the second memory means of a corresponding microinstruction;

a second address bus for coupling between the converting means and the second memory means for providing an address of a microinstruction to the second memory means; and a second data bus for coupling between the second memory means and the microprocessor integrated circuit for conveying an addressed microinstruction to the microprocessor integrated circuit, wherein the first address bus comprises a plurality of signal lines the number of which defines a maximum possible memory address value and wherein the microprocessor integrated circuit further comprises address generation means coupled to the first address bus, the address generation means comprising:

means, responsive to a logical state of a bit or bits of at least one of the microinstructions, for generating an address within a range of addresses having a maximum value that is less than the maximum possible memory address value; wherein the first address bus comprises 32 signal lines and wherein the address value generating means generates memory addresses within a range of addresses having a maximum value that requires for expression only 31 of the 32 first address bus signal lines.

8. A microprocessor integrated circuit comprising:

arithmetic/logic execution means for performing arithmetic and/or logical operations on data in response to one or more microinstructions;

memory interface means for reading information from a memory means and for storing information within the memory means, the memory means storing at least data and macroinstructions, the memory interface means comprising an address bus and a data bus, the address bus being coupled at least to the first memory means for supplying addresses thereto, the data bus being coupled at least between the arithmetic/logic execution means and the memory means;

macroinstruction decoding means, coupled to the data bus, for decoding macroinstructions read from the memory means into a corresponding microinstruction or microinstructions; and status register means for indicating a plurality of status conditions, the status register means comprising a first plurality of status bits that are set or reset as a result of the operation of the arithmetic/logic execution means, the status register means further comprising a second plurality of status bits that are programmably set or reset by a bit or bits of at least one of the microinstructions, wherein certain of the microinstructions are conditional branch microinstructions that test a condition of a status bit belonging to either the first plurality of status bits or the second plurality of status bits.

9. A microprocessor integrated circuit comprising:

first memory interface means for reading information from a first memory means and for storing information within the first memory means, the first memory means storing at least data and macroinstructions, the first memory interface means comprising a first address bus and a first data bus, the first address bus being coupled at least to the first memory means for supplying addresses thereto;

macroinstruction decoding means, coupled to the first data bus, for decoding a macroinstruction read from the first memory means into a corresponding microinstruction or microinstructions;

the microprocessor integrated circuit further comprising:

address generation means for generating memory addresses for accessing address locations within the first memory means, the address generation means having an output coupled to the first address bus and comprising:

address translation means responsive to a logical state of a bit or bits of at least one of the microinstructions for translating a virtual memory address to a physical memory address; the address translation means comprising:

address translation entry storage means having a plurality of storage locations each of which stores at least a virtual memory address page number and a corresponding physical memory address page number;

comparing means for comparing a virtual memory address page number, that is generated in response to the microprocessor integrated circuit performing a read or write operation to the first memory means, to stored virtual memory address page numbers for determining if a stored virtual memory address page number equals the generated virtual address memory page number; and means, responsive to the operation of the comparing means determining that one of the stored virtual memory address page numbers equals the generated virtual memory address page number, for replacing the generated virtual memory address page number with the corresponding stored physical address page number such that the first address bus transmits the corresponding physical memory address page number to the first memory means; and wherein a first plurality of the address translation entry storage locations are responsive to a first logical state of a bit or bits of at least one of the microinstructions for storing a virtual memory address page number and a physical memory address page number at a location least recently used for replacing a virtual memory address with a physical memory address, and a second plurality of the address translation entry storage locations are responsive to a second logic state of the bit or bits of the at least one of the microinstructions for storing a virtual memory address page number and a physical memory address page number at a location explicitly identified by the logical state of a microinstruction bit or bits.

10. A microprocessor integrated circuit as defined in claim 9 wherein the first address bus comprises a plurality of signal lines the number of which defines a maximum possible memory address value and wherein the address generation means is responsive to a logical state of a bit or bits of at least one of the microinstructions for generating an address within a range of addresses having a maximum value that is less than the maximum possible memory address value.

11. A microprocessor integrated circuit as defined in claim 10 wherein the first address bus comprises 32 signal lines and wherein the address generation means generates memory addresses within a range of addresses having a maximum value that requires for expression only 24 of the 32 first address bus signal lines.

12. A microprocessor integrated circuit as defined in claim 10 wherein the first address bus comprises 32 signal lines and wherein the address generation means generates memory addresses within a range of addresses having a maximum value that requires for expression only 31 of the 32 first address bus signal lines.

13. A microprocessor integrated circuit as defined in claim 9 wherein said macroinstruction decoding means includes:

second memory interface means for interfacing to second memory means that is disposed external to the microprocessor integrated circuit, the second memory means storing the microinstructions, the second memory interface means comprising:

means for converting a macroinstruction read from the first memory means into an address within the second memory means of a corresponding microinstruction;

a second address bus coupled between the converting means and the second memory means for providing an address of a microinstruction to the second memory means; and a second data bus coupled between the second memory means and the microprocessor integrated circuit for conveying an addressed microinstruction to the microprocessor integrated circuit.

14. A microprocessor integrated circuit as defined in claim 13 wherein each of the microinstructions comprises a plurality of bits and wherein the second data bus has a plurality of signal lines that is fewer in number than the plurality of bits such that the microinstruction is conveyed in more than one segment.

15. A microprocessor integrated circuit as defined in claim 14 wherein each of the microinstructions is comprised of fields of data bits, the fields comprising:

a process field;
  a condition code field;
  a memory field; and
  a branch field; and wherein the memory field and the branch field define a first one of the segments that is conveyed first and the process field and the condition code field define a second one of the segments that is conveyed at a time subsequent to the first segment.

16. A microprocessor integrated circuit as defined in claim 13 wherein each of the microinstructions comprises 56 bits and wherein the second data bus is comprised of 28 signal lines for conveying a microinstruction in two segments, and wherein the second address bus includes a selection signal line for selecting between the two segments.

17. A microprocessor integrated circuit comprising:

means for fetching macroinstructions from a memory means;

means for translating a fetched macroinstruction into one or more microinstructions, each microinstruction having a plurality of fields;

means, responsive to a microinstruction, for performing an operation that is specified by at least one field of the microinstruction;

condition code register means comprising a plurality of condition bits, the condition code register means being responsive to a content of a condition code field of a microinstruction for selectively setting the plurality of condition bits in accordance with one of a result of an operation that occurs within the microprocessor integrated circuit and a result of an operation that occurs external to the microprocessor integrated circuit;

a plurality of input signal terminals;

means having an input coupled to the plurality of input signal terminals, and being responsive to a logical state of individual ones of the plurality of input signal terminals and also being responsive to a content of the condition code field of a microinstruction, for setting a logical state of predetermined ones of the plurality of condition bits to a state that is a function of the logical state of individual ones of the plurality of input signal terminals, whereby said predetermined ones of the plurality of condition bits are selectively set to a logical state that is a function of a result of an operation that occurs within the microprocessor integrated circuit and a function of a result of an operation that occurs external to the microprocessor integrated circuit, as a function of the content of the condition code field of a microinstruction; and means for testing said plurality of condition bits and for redirecting the fetching of macroinstructions upon detecting a predetermined state of said plurality of condition bits.

* * * * *